US007069573B1

(12) United States Patent
Brooks et al.

(10) Patent No.: US 7,069,573 B1
(45) Date of Patent: Jun. 27, 2006

(54) PERSONAL BROADCASTING AND VIEWING METHOD OF AUDIO AND VIDEO DATA USING A WIDE AREA NETWORK

(75) Inventors: Roger K. Brooks, Palo Alto, CA (US); Yanda Ma, Milpitas, CA (US); Dave M. Singhal, San Jose, CA (US)

(73) Assignee: Vidiator Enterprises Inc., Nassau (BS)

( * ) Notice: Subject to any disclaimer, the term of this patent is extended or adjusted under 35 U.S.C. 154(b) by 0 days.

(21) Appl. No.: 09/539,492

(22) Filed: Mar. 30, 2000

Related U.S. Application Data

(60) Provisional application No. 60/170,079, filed on Dec. 9, 1999.

(51) Int. Cl.
*H04N 7/16* (2006.01)
*H04N 7/173* (2006.01)

(52) U.S. Cl. ......................................... 725/62; 725/9.5
(58) Field of Classification Search .................. 725/59, 725/62, 86, 91, 94, 98, 109, 112, 95, 96; 375/240.01–240.09; 370/319–321, 395.5, 370/64, 401; 709/200, 231, 823; 455/3.06, 455/426.1
See application file for complete search history.

(56) References Cited

U.S. PATENT DOCUMENTS

| 5,032,927 | A | | 7/1991 | Watanabe et al. ........... 358/335 |
| 5,091,782 | A | | 2/1992 | Krause et al. .............. 358/135 |
| 5,422,674 | A | | 6/1995 | Hooper et al. ............. 348/409 |
| 5,602,589 | A | | 2/1997 | Vishwanath et al. ........ 348/398 |
| 5,737,595 | A | | 4/1998 | Cohen et al. ............... 395/611 |
| 5,909,250 | A | | 6/1999 | Hardiman .................. 348/405 |
| 5,923,384 | A | | 7/1999 | Enomoto et al. ........... 348/705 |
| 5,970,233 | A | | 10/1999 | Liu et al. ............... 395/200.76 |
| 6,014,694 | A | * | 1/2000 | Aharoni et al. ............. 709/219 |
| 6,037,991 | A | | 3/2000 | Thro et al. .................. 348/469 |
| 6,043,837 | A | | 3/2000 | Driscoll, Jr. et al. .......... 348/36 |
| 6,064,437 | A | | 5/2000 | Phan et al. ................. 348/446 |
| 6,091,777 | A | | 7/2000 | Guetz et al. ................ 375/240 |
| 6,094,219 | A | | 7/2000 | Roberts et al. ............. 348/207 |
| 6,147,703 | A | | 11/2000 | Miller et al. ................ 348/220 |
| 6,166,729 | A | * | 12/2000 | Acosta et al. ............... 345/719 |
| 6,192,196 | B1 | | 2/2001 | Keller ......................... 396/20 |
| 6,201,356 | B1 | | 3/2001 | Ushijima et al. ........... 315/282 |
| 6,212,550 | B1 | | 4/2001 | Segur ......................... 709/206 |
| 6,219,089 | B1 | | 4/2001 | Driscoll, Jr. et al. .......... 348/36 |

(Continued)

*Primary Examiner*—Chris Grant
*Assistant Examiner*—Christopher Nalevanko
(74) *Attorney, Agent, or Firm*—Seed IP Law Group PLLC

(57) ABSTRACT

A method for transmitting audio/video data from a web site to viewing devices, e.g., personal digital assistant, cellular phone. The method includes prompting at least two selections on a viewing device, which is coupled to a worldwide network of computers through a wireless connection. The two selections comprises a first selection for an automatic set up (441) and a second selection for a manual set up. The method includes selecting either the first selection or the second selection and transmitting the selection to a web site, which is coupled to a source of audio/video data, e.g., camera. If the first selection is entered, a web page based upon a viewer's profile of the viewing device is formed and transmitted to the viewing device. Alternatively, if the second selection is entered, a form page of selectable parameters is formed and transmitted from the web site to the viewing device. Next, audio/video data from the web site is transmitted to the viewing device based upon the first selection or the second selection.

21 Claims, 19 Drawing Sheets

U.S. PATENT DOCUMENTS

| | | | |
|---|---|---|---|
| 6,256,453 B1 | 7/2001 | Takano | 386/126 |
| 6,278,739 B1 | 8/2001 | Enomoto et al. | 375/240.26 |
| 6,292,834 B1 * | 9/2001 | Ravi et al. | 709/233 |
| 6,298,385 B1 | 10/2001 | Sparks et al. | 709/233 |
| 6,356,945 B1 * | 3/2002 | Shaw et al. | 709/231 |
| 6,385,772 B1 * | 5/2002 | Courtney | 725/105 |
| 6,392,692 B1 | 5/2002 | Monroe | 348/143 |
| 6,412,004 B1 * | 6/2002 | Chen et al. | 709/226 |
| 6,412,008 B1 * | 6/2002 | Fields et al. | 709/228 |
| 6,453,355 B1 * | 9/2002 | Jones et al. | 709/230 |
| 6,457,052 B1 * | 9/2002 | Markowitz et al. | 709/225 |
| 6,539,547 B1 | 3/2003 | Driscoll, Jr. et al. | 725/91 |
| 6,647,425 B1 * | 11/2003 | Chaddha | 709/233 |
| 2003/0106063 A1 * | 6/2003 | Guedalia | 725/90 |

* cited by examiner

US 7,069,573 B1

PERSONAL BROADCASTING AND VIEWING METHOD OF AUDIO AND VIDEO DATA USING A WIDE AREA NETWORK

CROSS REFERENCES TO RELATED APPLICATIONS

The present application claims priority to and is a continuation in part of U.S. Ser. No. 60/170,079 field Dec. 9, 1999, commonly owned, and hereby incorporated by reference. Additionally, the following commonly-owned co-pending applications, including this one, are being filed concurrently and the others are hereby incorporated by reference in their entirety for all purposes:
  A. U.S. patent application Ser. No. 09/539,728;
  B. U.S. patent application Ser. No. 09/539,193;
  C. U.S. patent application Ser. No. 09/539,194;

BACKGROUND OF INVENTION

The present invention relates generally to digital video processing techniques. More particularly, the invention provides a technique including a method for capturing audio and video information from a first source and displaying such video and audio information at a second source, where the format of the first source and the format of the second source are different from each other. Merely by way of example, the present invention can be applied to a wireless communication environment. It would be recognized, however, that the invention has a much broader range of applicability. For example, the invention can be applied to devices such as personal computers, personal digital assistants, cellular phones, lap top computers, note book computers, work stations, television sets, web appliances, all other devices which can communicate over a network and which are capable of outputting audio and/or video.

Long distance wireless communication has evolved over many years of human development. At one time, people communicated to each other over extended geographical locations by primitive wireless methods. Yelling or shouting often provided the only way to communicate from one person to another person in a wireless manner. Face to face yelling or shouting was often very effective. Such yelling, however, was often limited to the strength of the yelling person's voice, which could generally not carry greater than 300 feet or so. Additionally, environmental factors such as rain, wind, or snow limited the length of distance that could be communicated over effectively. Although effective for close distances, long distance wireless communication over larger geographical spans would often be ineffective.

Other ways of communicating using a wireless medium followed. For example, drumbeats replaced, in part, yelling or shouting. Certain tribal people communicated over great geographic distances to inform others of "danger" or the like used drumbeat signals. These signals were effective for some applications but still involved physical human means for implementing and carrying out the signals. Depending upon the strength of the person, drumbeats provided limited intensity. Additionally, drumbeats possessed poor "signal to noise" after a certain distance. Accordingly, drumbeats had to be replaced, at least in part. In some cultures, carrier pigeons carried messages between people over extended geographic areas. Small messages, which were written on scraps of paper, often attached to legs of carrier pigeons, which flew from one location to another location. In many urban areas, these carrier pigeons were quite effective in sending messages. Although somewhat effective, many limitations still existed. For example, only a limited amount of information could be attached to the small legs of the carrier pigeon. Additionally, carrier pigeons often died, when diseased. Further, carrier pigeons required feed and had to be cleaned, since they were quite messy. Accordingly, carrier pigeons also had to be replaced.

Many of these primitive techniques have been replaced by radio, cellular phones, television, and other modern day communication means. These communication means were often good for communicating a certain type of information. For example, radio transmits voice information, such as people, songs, and the like, which is broadcast to a plurality of users. Cellular phones also transmit voice information. Such phones provide user to user communication. An example of a modern day technology for cellular phones is a technology commonly called "CDMA" developed by Qualcomm of San Diego, Calif. CDMA allows a user of a cellular phone to call anyone from anywhere in a mobile manner in the United States. Television similar to radio also provided broadcast communication of video programs to a wide variety of users. Television would be broadcast using television towers or satellites and the like.

Despite the availability of these modern day techniques, numerous limitations still exist. All of these techniques often have different formats, which make information difficult to transfer from one device type to another device type. Such formats are also difficult to control especially for a combination of audio and video information. Further, each of these techniques is often single purpose, which also limits use of each of these techniques. Additionally, video broadcasting for personal content information could not be distributed effectively, since many end user devices often used different formats and the like. Although there have been many advances, there are still numerous limitations, as noted.

From the above, it is seen that a technique for providing video information to people in an improved manner is highly desirable.

SUMMARY OF THE INVENTION

According to the present invention, techniques including a method for digital video processing are provided. In an exemplary embodiment, the present invention provides a method for personal broadcasting where the source audio/video and the displayed audio/video can be in a different format. In a specific embodiment, the present invention provides a novel registration process for a mobile computing device including a browsing device.

In a specific embodiment, the present invention provides a method for digital audio/video transmission to mobile computing devices including registering a client device with a web server for receiving audio/video data in a useable format. The method includes entering profile information directed to a selected format of a mobile client device to a web server. The mobile device capable of receiving audio/video data from at least one of a plurality of audio/video source devices. The mobile client device is one of a plurality of mobile client device, where each of the mobile client devices is capable of receiving audio/video data in one of a plurality of selected formats. Some of the devices can only receive auto/video data in a single format. The method also includes determining a processing program for the selected format from one of a plurality of programs, where each of the plurality of programs being stored in a web server. The method includes connecting at least one of the plurality of source devices of audio/video data to the web server, where each of the source devices being capable of outputting audio/video data in one or more formats. The method includes converting the audio/video data from its format to the selected format through the processing program in the web server; and transferring audio/video data in the selected format from the web server to the mobile client device.

In an alternative embodiment, the present invention provides a method for transmitting audio/video data from a web site to viewing devices, e.g., personal digital assistant, cellular phone. The method includes prompting at least two selections on a viewing device, which is coupled to a worldwide network of computers through a wireless connection. The two selections comprises a first selection for an automatic set up and a second selection for a manual set up. The method also includes selecting either the first selection or the second selection and transmitting the selection to a web site, which is coupled to a source of audio/video data, e.g., camera. If the first selection is entered, a web page based upon a viewer's profile of the viewing device is formed and transmitted to the viewing device. Alternatively, if the second selection is entered, a form page of selectable parameters is formed and transmitted from the web site to the viewing device. Next, audio/video data from the web site is transmitted to the viewing device based upon the first selection or the second selection.

Numerous benefits may be achieved by way of the present invention over conventional techniques. In some embodiments, the present invention provides an easy to implement personal broadcasting system using conventional digital video cameras and the like. The invention also provides a way for one mobile device to communicate audio/video with another mobile device, even if the devices are not compatible with each other. In other aspects, the invention provides a novel broadcast server, which is coupled to a worldwide network of computers, including an internet or the Internet. Depending upon the embodiment, one or more of these benefits may exist.

These and other benefits are described throughout the present specification and more particularly below.

DETAILED DESCRIPTION OF THE INVENTION

Figure 1:
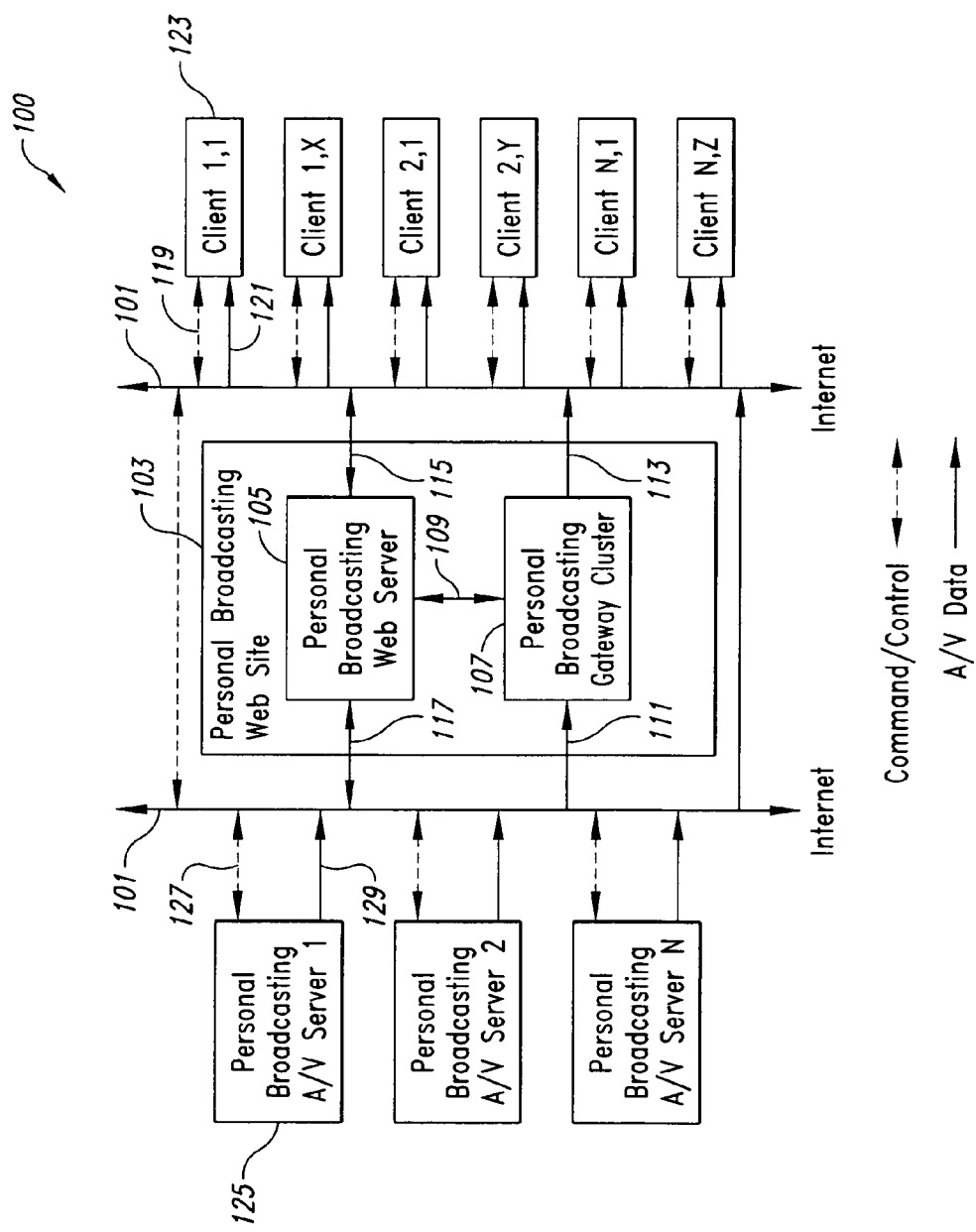
FIG. 1 is a simplified diagram of a broadcasting system according to an embodiment of the present invention.

FIG. 1 is a simplified diagram of a broadcasting system 100 according to an embodiment of the present invention. This diagram is merely an example, which should not unduly limit the scope of the claims herein. One of ordinary skill in the art would recognize many other variations, modifications, and alternatives. In an exemplary embodiment, the present invention provides a personal broadcasting system for broadcasting personal video and audio. As shown, the broadcasting system includes a variety of elements such as a world wide network of computers 101, which can be an internet, the Internet, or the like. The network can be coupled to an alternative wide area network, a local area network, an intranet, any combination thereof, and others.

Central in the system is a personal broadcasting web site 103 or Web site, which is coupled to the network. Personal broadcasting web site includes many elements such as a personal broadcasting web server ("PBWS") coupled to a personal broadcasting gateway cluster, which will be described later. Personal broadcasting web server provides command and control information, as shown by the dotted lines, between the gateway cluster, a plurality of client devices 123, and a plurality of personal broadcasting audio/video servers 125. Other devices can also exist in the network. Each of the plurality of audio/video servers provides audio/video data to be broadcast either to a group of viewers, a single user, the public, or any combination thereof. Each of the viewers is defined by each of the client devices 123, which are also coupled to the worldwide network.

Figure 1A:
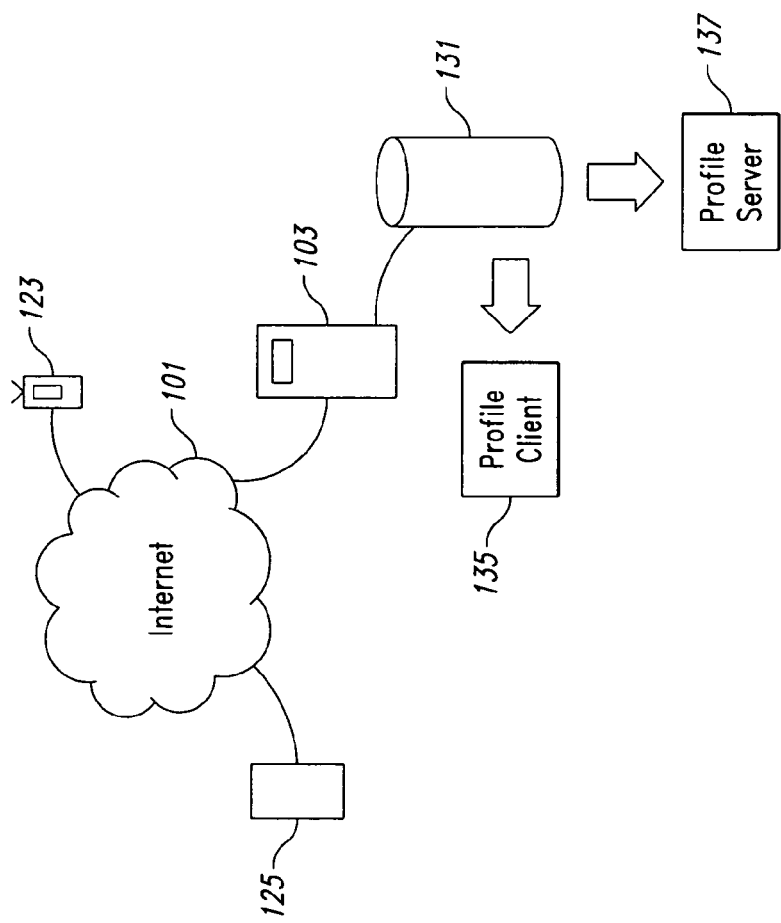
FIG. 1A is a simplified diagram of an audio/video server according to an embodiment of the present invention.

The personal broadcasting web site can be accessed by any of the servers. Each of the servers is a source of audio/video data. As merely an example, FIG. 1A is a simplified diagram of an audio/video server according to an embodiment of the present invention. This diagram is merely an example that should not limit the scope of the claims herein. One of ordinary skill in the art would recognize many other variations, modification, and variations. As shown, like reference numerals are used in this Fig. as some of the other Figs. for cross referencing purposes. The web site 103 is coupled to the Internet 101. The web site includes a database 131, which stores profile information 135 for each of the client devices. Profile information 137 is also stored for each of the personal broadcasting audio/video servers. Profile information is entered into the web site by any of the techniques described herein and others. Further details of the profile information is provided below. The personal broadcasting web site transfers audio/video data from the website to the plurality of client devices 123, e.g., 11, 1X, 21, 2Y, N1, NZ. The client devices can include a personal computer, a work station, an internet appliance, and a mobile computing device. The mobile computing device is preferred. Here, the mobile computing device includes a browsing device which couples to the personal broadcasting audio/video servers. Details of the mobile computing device is provided in U.S. Ser. No. 09/502,549, commonly assigned, and which is incorporated by reference for all purposes.

Figure 2:
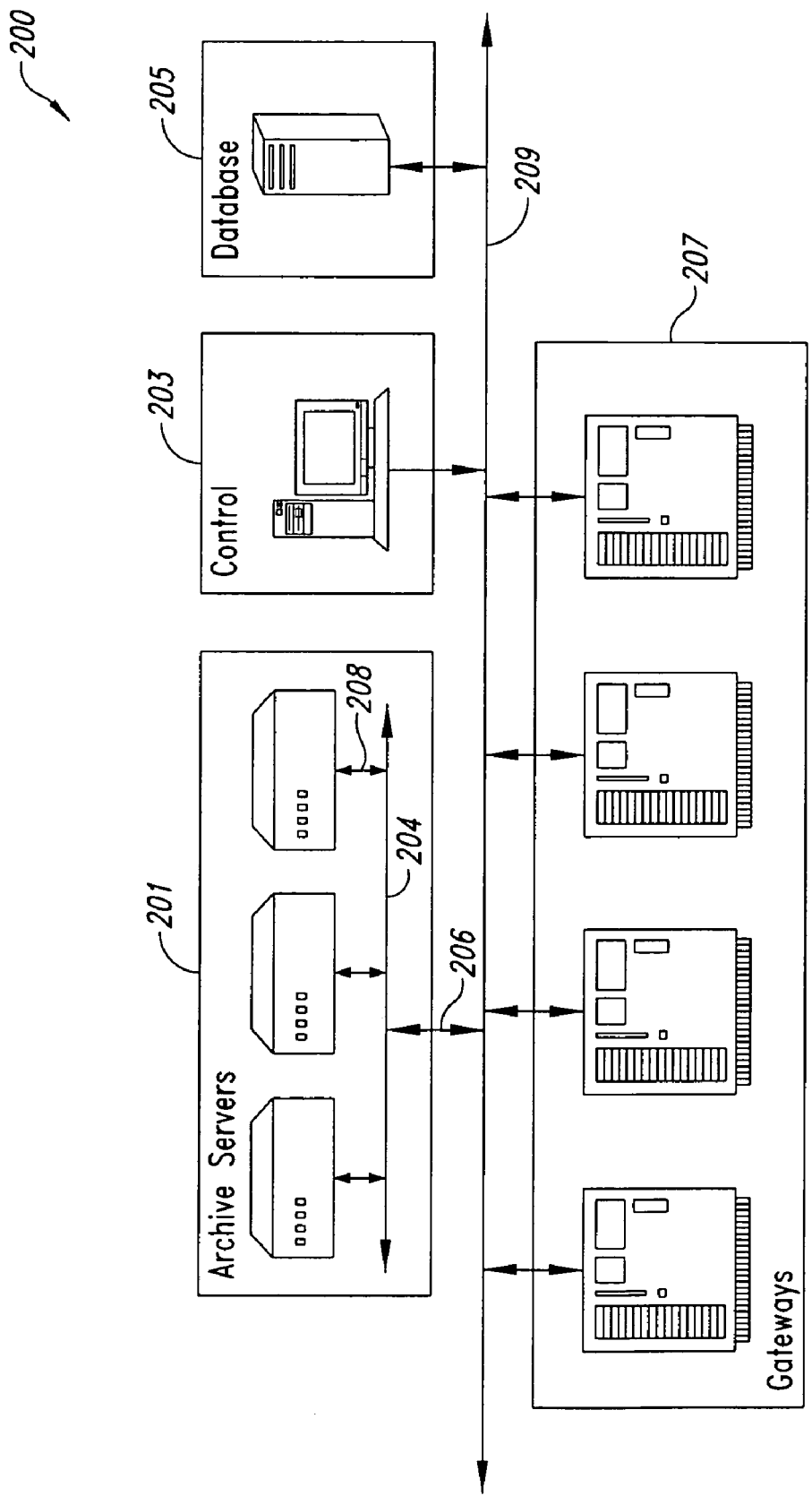
FIG. 2 is a simplified diagram of a personal broadcasting gateway cluster according to an embodiment of the present invention.
Figure 2A:
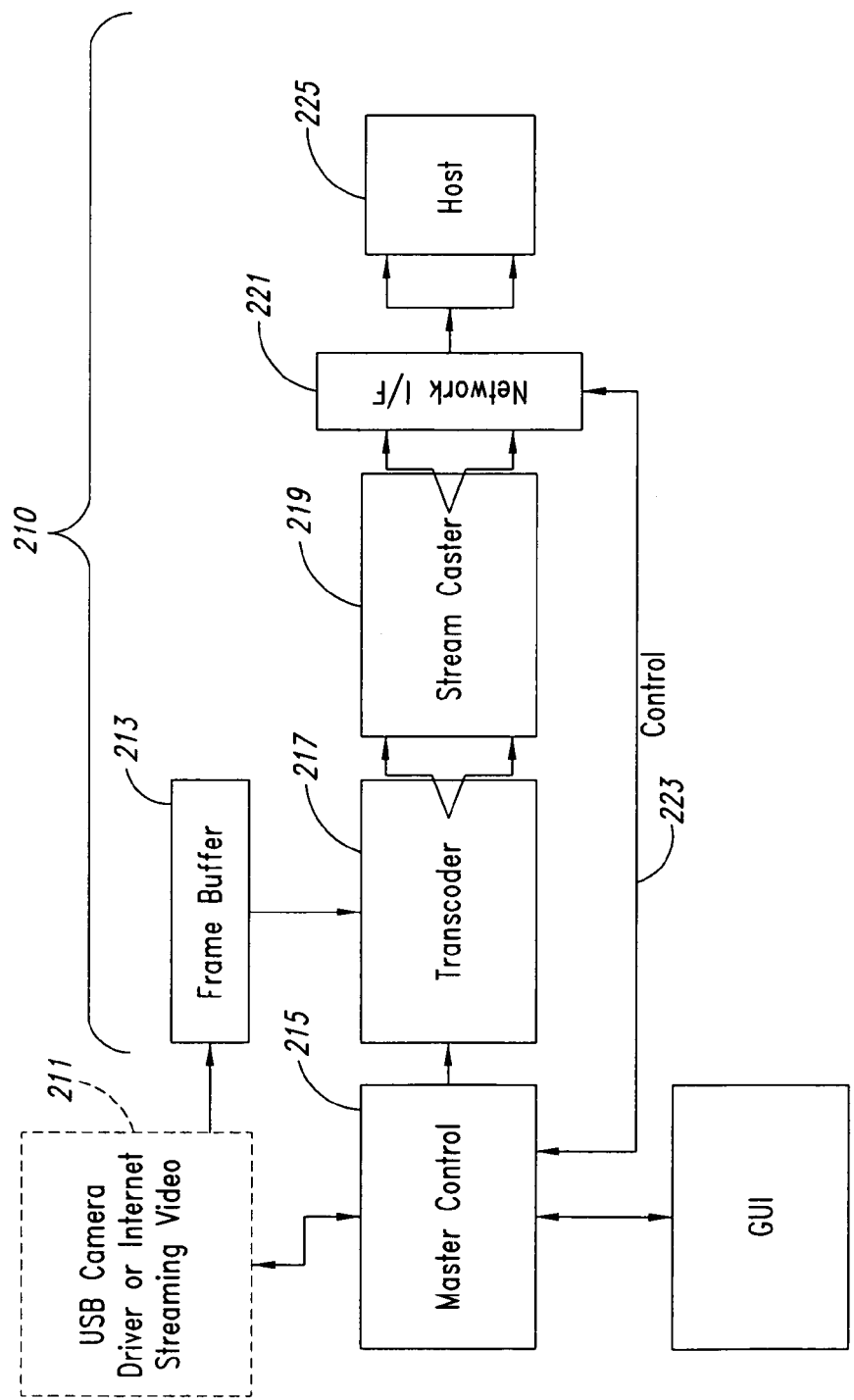
FIGS. 2A to 2E are simplified diagrams of video information stream flows according to embodiments of the present invention.

FIG. 2 is a simplified diagram of a personal broadcasting gateway cluster 200 according to an embodiment of the present invention. This diagram is merely an example, which should not unduly limit the scope of the claims herein. One of ordinary skill in the art would recognize many other variations, modifications, and alternatives. As shown, the gateway cluster 200 includes a variety of elements such as a plurality of archive servers, which are each coupled to each other through common line 204, which is coupled via line 206 to the Internet 209. Archive servers are coupled to control 203 server, which is also coupled to the Internet. Other elements include a database coupled to the network and a plurality of gateway servers 207, which are each coupled to the Internet. The gateway cluster interfaces with the personal broadcasting web server for control information. Audio/video data from any of the server devices are distributed to one client, a group of clients, or to the public, or any combination thereof. Further details of the gateway cluster are described in U.S. Ser. No. 09/539,193, commonly assigned, and hereby incorporated by reference for all purposes.

In a specific embodiment, each of the archive servers includes a processing unit coupled to a mass memory device. The mass memory device is capable of storing streaming video. Here, the mass memory device can be a variety of devices such as a tape device, a hard disk drive, a removable hard disk drive, floppy drive, optical drives, and many other drives. Each of these servers can be coupled to each other through a common bus 204 for scaling purposes. Here, additional servers can be added without any detrimental influence in performance or the like. In a specific embodiment, each of the gateway devices is also coupled to a common interface such as the Internet. Accordingly, it is possible to add additional gateway servers without any detrimental influence in performance ant like.

FIGS. 2A to 2E are simplified diagrams of video information stream flows according to embodiments of the present invention. These diagrams are merely examples which should not limit the scope of the claims herein. One of ordinary skill in the art would recognize many other variations, modifications, and alternatives. FIGS. 2A to 2E are simplified diagrams of video information stream flows according to embodiments of the present invention. These diagrams are merely examples which should not limit the scope of the claims herein. One of ordinary skill in the art would recognize many other variations, modifications, and alternatives. As shown, FIG. 2A includes a video device drive 211, which generates video data. The video data is compressed into a first compressed packetized stream, which is transferred to the personal broadcasting web site 210 via the Internet or the like. Details of such technique is described in U.S. Ser. No. 09/502,549, commonly assigned and hereby incorporated by reference. For easy reading, video device driver is used herein as data acquisition block, which can be a part of the web site.

As shown, the video device transfer compressed data through the Internet to a frame buffer 213. In the present embodiment, frame buffer 213 is used to buffer the stream of video data from data acquisition block, for processing by transcoder block 217. In this embodiment, the type of data and the rate at which frame buffer is updated are fixed by data acquisition block 211, under control of control block 215. In this embodiment, the data stored in frame buffer 213 may include pixels of video data having associated values (uncompressed); frames of video data that have been compressed with a quantized DCT operation; and the like. In one embodiment of the present invention, the video data may be stored in RGB component space, YUV component space, HSV component space, gray scale, and the like.

In one embodiment of the present invention, frame buffer 410 typically includes one or two buffers, each having a frame size of approximately 800 horizontal pixels by 600 vertical pixels (800×600). Each buffer typically has a bit-depth of at least 24 bits in one embodiment. Frame buffer 410 is typically minimally embodied as a 3 Megabyte DRAM, although larger sized memories may also be used. Alternatively, SRAM devices or embedded DRAM, or the like may also be used. In this embodiment, transcoder block 215 retrieves incoming data from frame buffer 213 fully decompresses or partially decompresses the data, reduces the bandwidth of the data, and forms a stream of output data in a desired format. Transcoder block 217 receives the bandwidth requirements and the desired output format from control block 215. Further detail regarding transcoder block 217 will be given below.

In the present embodiment, stream caster block 219 is typically used to receive a stream of output video data from transcoder block 217 and to format the data for transmission to network interface 221. In this embodiment, network protocols used include TCP/IP protocols, although in other embodiments, other network protocols may also be used. In this embodiment, stream caster block 219 packetizes the output data stream, and determines IP addresses, payload lengths, and the like. Further, stream caster block 219 forwards the data segments into the appropriate TCP socket of network interface 221.

In this example, network interface 221 receives the segmented data from stream caster 219 and transmits the data to a network. The network, may be a computer network such as the Internet, a LAN, or the like. In the present embodiment, the network is TCP/IP based. In the present embodiment, network interface 221 is used to create, monitor, and close all the TCP/IP sockets and RTSP. In this embodiment, network interface also sends and receives data to and from a network via the TCP/IP sockets and sends incoming data to control block 215. In alternative embodiments, network interface may use other network protocols such as IPX, and other conventional and future-developed network protocols. Further, network interface 221 may use other data streaming protocols such as RTP, and any other conventional and future-developed streaming protocol.

Figure 2B:
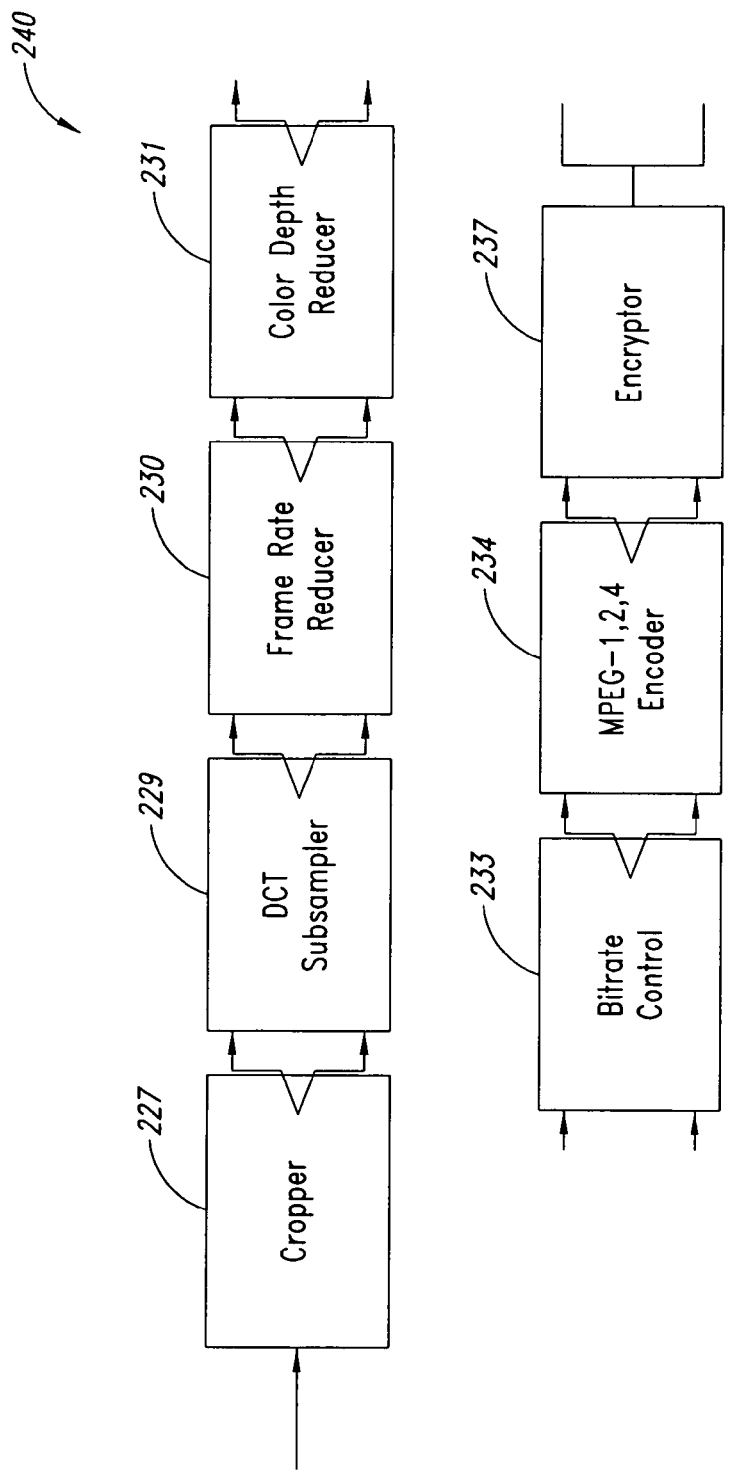

FIG. 2B illustrates a simplified block diagram according to an embodiment of the present invention. In particular, FIG. 2B illustrates functional blocks available in a transcoder 240 according to one embodiment. Transcoder 240 includes a cropper block 227, a sampler block 229, a frame rate block 230, a color depth block 231, a bit rate control block 233, an encoder block 235, and an encryptor block 237. As was illustrated in FIG. 2A, transcoder is coupled to a frame buffer, and outputs data to stream caster, in the present embodiment.

In FIG. 2B, cropper block 227 retrieves frames of data from frame buffer. In this embodiment, cropper block extracts a rectangular region of data from each frame retrieved from frame buffer. The extents of the rectangular region are specified in a "stream table" when receiving streaming video data. If no cropping is specified, cropper block 227 merely grabs the whole frame. Cropping is specified when there is a particular portion within a video frame that the requester wants to see.

Also illustrated in FIG. 2B is a sampler block 229 that receives input from cropper block 227. In this embodiment, sampler block receives a desired output spatial resolution from control block. In one embodiment of the present invention, sampler block, subsamples the image received from cropper block, to obtain the desired output resolution. As an example, an incoming frame may have 640 horizontal pixels×480 vertical pixel resolution, however the desired output video image is 80 pixels×60 pixels. In such an example, cropper block may simply take every eighth pixel of the incoming frame for the output frame. Other methods of subsampling are also contemplated, for example, cropper block may average eight pixels to obtain the value for the output pixel. Other methods, such as filtering, for subsampling are contemplated in alternative embodiments of the present invention.

In another embodiment, sampler block 229, supersamples the image from cropper block, to obtain the desired output resolution. As an example, an incoming frame may have an 80×60 pixel resolution, however the desired output video image has a 640×480 pixel resolution. An example of this may be a-hand-held wireless video camera transmitting live video to a newsroom computer via the Internet. In such an example, cropper block may use any conventional method for upscaling the image. For example, cropper block may use pixel replication, with or without bi-linear, or bi-cubic filtering techniques, and the like. Other methods for upscaling the incoming frame are contemplated in alternative embodiments of the present invention.

In the present example, frame rate block 230 receives the sampled frames of data from cropper block. Frame rate block 230 also receives an indication of a desired frame rate for output video from control block, typically in frames per second (fps). In the present embodiment, control block also knows the frame rate of the incoming video, also in fps. This frame rate is also sent to frame rate block.

In one embodiment, of the present invention, frame rate block compares the incoming frame rate to the desired output frame rate, and adjusts the number of frames accordingly. For example, frame rate block will drop frames of data to lower the number of frames per second, or will add frames of data to increase the number of frames per second. In the case where the output frame rate is lower than the input frame rate, frame rate block may use a counter to count to a specific number. When the number is reached, the current frame is dropped, or alternatively, the current frame is not dropped. For example, if the desired frame rate is 10 fps and the incoming frame rate is 11 fps, every time a counter counts to 10, the next frame is simply dropped. As another example, if the desired output frame rate is 5 fps, and the incoming frame rate is 30 fps, every time the counter counts to 6, the next frame is not dropped, but is passed to the next functional block.

In another embodiment, frame rate block may be embodied as a first-in first-out frame (fifo) stack. In such an example, frames of input video are stored in a buffer location specified by a write pointer, and frames of output video are retrieved from a buffer location specified by a read pointer. In operation, every incoming video frame is written into the fifo stack, however, only when the frame is to be output is the write pointer incremented. In such a case, data read out of the fifo stack may be sequential. Still other methods for reducing the frame rate are contemplated in alternative embodiments of the present invention.

In an alternative embodiment of the present invention, frame rate block adds frames to increase the frame rate. For example, if the incoming frame rate is 10 fps, and the desired frame rate is 20 fps, frame rate block 530 will add frames to the video stream every other frame. One technique for increasing the numbers of frames involves interpolating the motion vectors of blocks in the frames. Many other methods for adding frames and increasing the frame rate are contemplated in alternative embodiments of the present invention, however are outside the scope of the present technical disclosure.

In the example in the Fig., color depth reducer block 231 sequentially receives the frames of data from frame rate block. In one embodiment, color depth reducer block also receives an indication of the bit-depth for pixels in the incoming frame of data, and the desired bit-depth. In the present embodiment, in response to the bit depths, color depth reducer block 231 maps the number of bits from the input frame to the desired number of bits in the output frame.

As an example, the incoming image may have a 30 bit bit-depth, for example three component color having 10 bits of hue data, 10 bits of saturation data, and 10 bits of intensity data; the desired bit depth of the output frame may be 6 bit gray scale. In such an example, to reduce the color depth, color depth reducer block may take only the 6 most significant digits in the intensity data for the output frame.

In another example, the incoming image may have a 24 bit bit-depth, for example, an RGB image having 24 bits of information (8:8:8), and the desired bit depth of the output frame may be 256 colors, or 8-bit color. In such an example, color depth reducer may re-map or dither, the values from the 24 bit color space into the 8 bit color space. Such dithering techniques are well known. In alternative embodiments, other types of techniques may be used to reduce the bit depth from an input video frame to obtain a desired output frame bit-depth. In alternative embodiments of the present invention, increasing the color bit-depth may also be performed, using known techniques.

In the present embodiment, bitrate control block 233 receives the output from color depth reducer block. In the present embodiment, bit rate control block also receives a desired output bit rate from control block. For M-JPEG encoding, bit rate control block 233 is used to statistically compute a new quantization scale factor for the data so that the effective bit rate more closely matches the desired output bitrate.

In the present embodiment, a quantization scale factor is first determined. The quantization scale factor is used to compress or expand a frame of data so that it more closely matches the desired output bit rate. In theory, in one embodiment the quantization scale factor is equivalent to a modulus (Mod) operator, or a most significant bits (MSBs) operator. In such cases, the differences between pixels that are close in value (e.g. 20 and 21), are ignored. As another example, values 20–23 may be considered the same as 20. In this example, the quantization scale factor is determined by analyzing the number of bits per second are produced by a t0 frame of data. The number of bits is divided by the frame time to obtain a calculated bit rate in this embodiment. This calculated bit rate is compared to a desired bit rate to obtain the quantization scale factor.

The quantization scale factor is then applied to scale the next frame of data, a t1 frame of data. Continuing the example above, the next frame of data may be scaled by 2, so that the bit rate of the next frame of data will be 10 kbps. In the present embodiment, bit rate scaling is performed by reducing the effective color depth by the quantization scale factor, to meet the desired bandwidth requirements. In this example, the color depth is halved, i.e. the bottom least significant bits (LSBs) are ignored.

In one embodiment of the present invention, bit rate control block monitors each frame, and attempts to control the bit rate to match the desired output bit rate for virtually all frames. In some embodiments, the quantization scale factor is updated every frame time, and in other embodiments, the quantization scale factor may be updated every Xth frame time. Where X is selectable automatically or manually.

In an alternative embodiment, a more simplistic techniques is utilized. In such an embodiment, if the incoming bit rate is above the desired output bit rate, a predetermined quantization scale factor is applied to the next frame. Further, if the incoming bit rate is below the desired output bit rate, another predetermined quantization scale factor is applied to the next frame. In such an embodiment, such predetermined quantization scaling factors may be selected ahead of time, based on empirical data, or the like. Still, in other embodiments of the present invention may provide for increasing the effective bit rate. Encoding block 235 next receives the bit-rate adjusted frames of data. Encoding block may also receive a request for an encoding data format; specified for by control block. Encoding block is embodied as an MPEG encoder. Encoding block may include dedicated hardware encoders, such as those available from Sigma Designs, and the like.

In the present embodiment, for MPEG-1, MPEG-2, and MPEG-4 encoding, it is contemplated that I-frame data will be compressed. In another embodiment, P-frames, and even B-frames may also be compressed. For MPEG-4 encoding, it is contemplated that both I-frame data and P-frame data be compressed for transmission purposes. Detail description of I, P, and B frames are outside the scope of this technical disclosure. In other embodiments of the present invention, alternative formats may specified, for example *.avi format video, *.mov format video, streaming video such as in the *.rm format from Real Networks, or *.asf format from Microsoft, or the like. Such formats may be in the public domain, or proprietary. Further, encoding block 560 may be embodied as specialized dedicated hardware, or as software routines on a digital signal processor (DSP), a microprocessor (Athlon, PentiumIII), or the like. After encoding, the video data may be encrypted by encryptor block 237.

The above embodiment was illustrated in the Fig. as having specified interconnections between blocks. However, in alternative embodiments of the present invention, the different blocks may be interconnect in different ways, and may be dynamically interconnected in different ways. As an example, an incoming frame may include 24-bits of 640× 280 color image whereas the desired output image is an 8 bit 80×60 gray scale image. In such an example, it is preferable to reduce the color depth information, before subsampling the image for sake of efficiency. In such a case, the data is passed to the color depth reducer 540 then to the sampler block. The interconnections between the blocks, and the data flow may be dynamic, and change according to specific need.

Figure 2C:
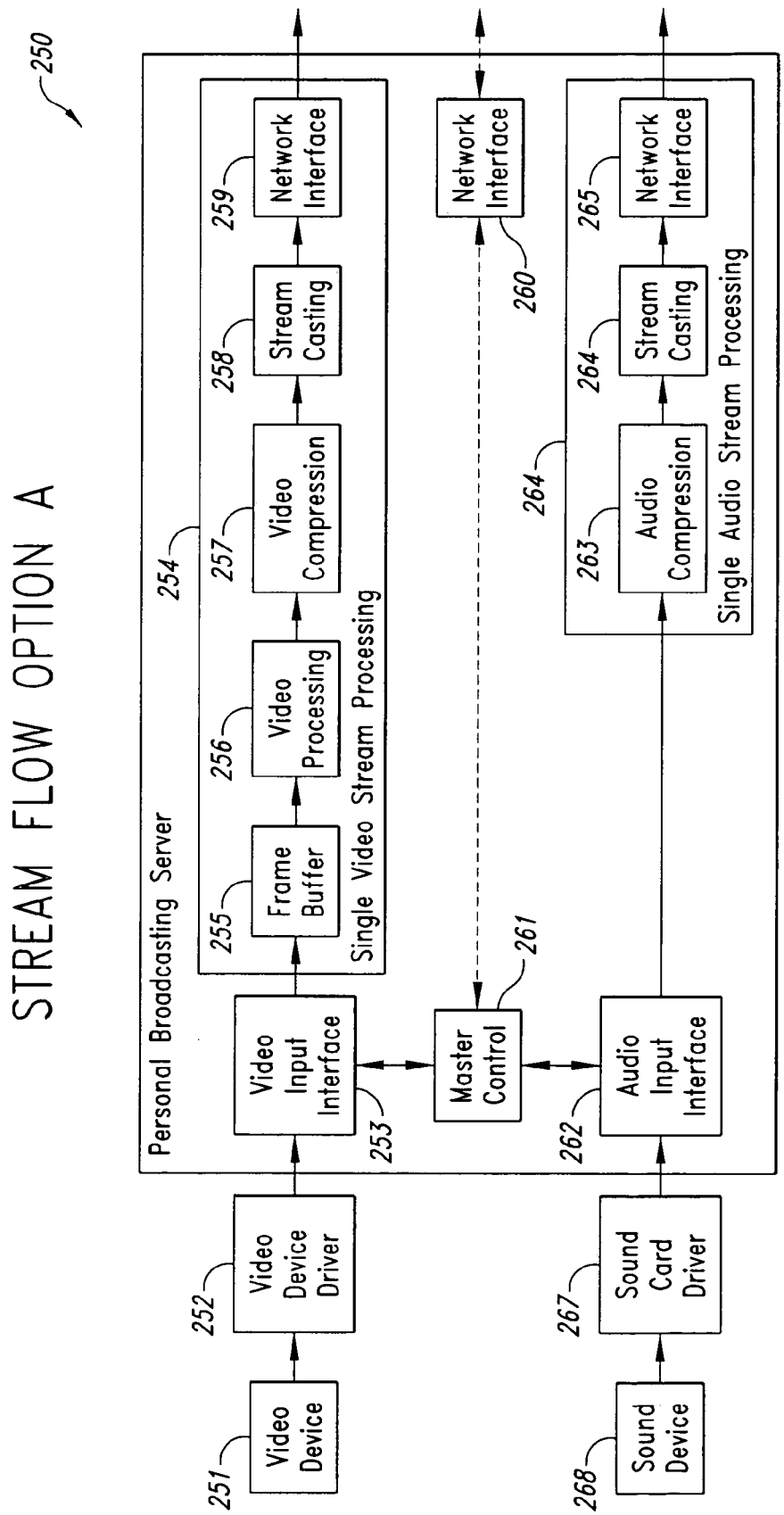
Figure 2D:
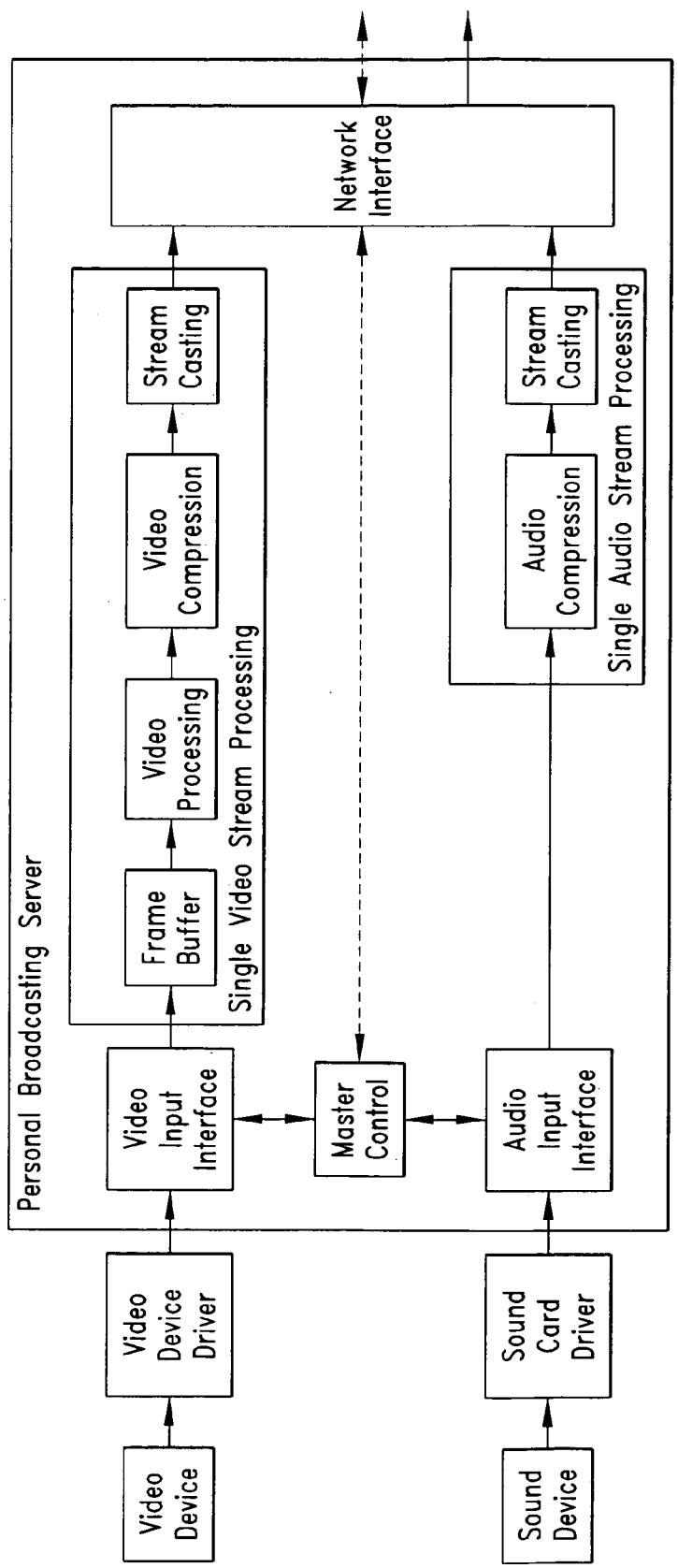
Figure 2E:
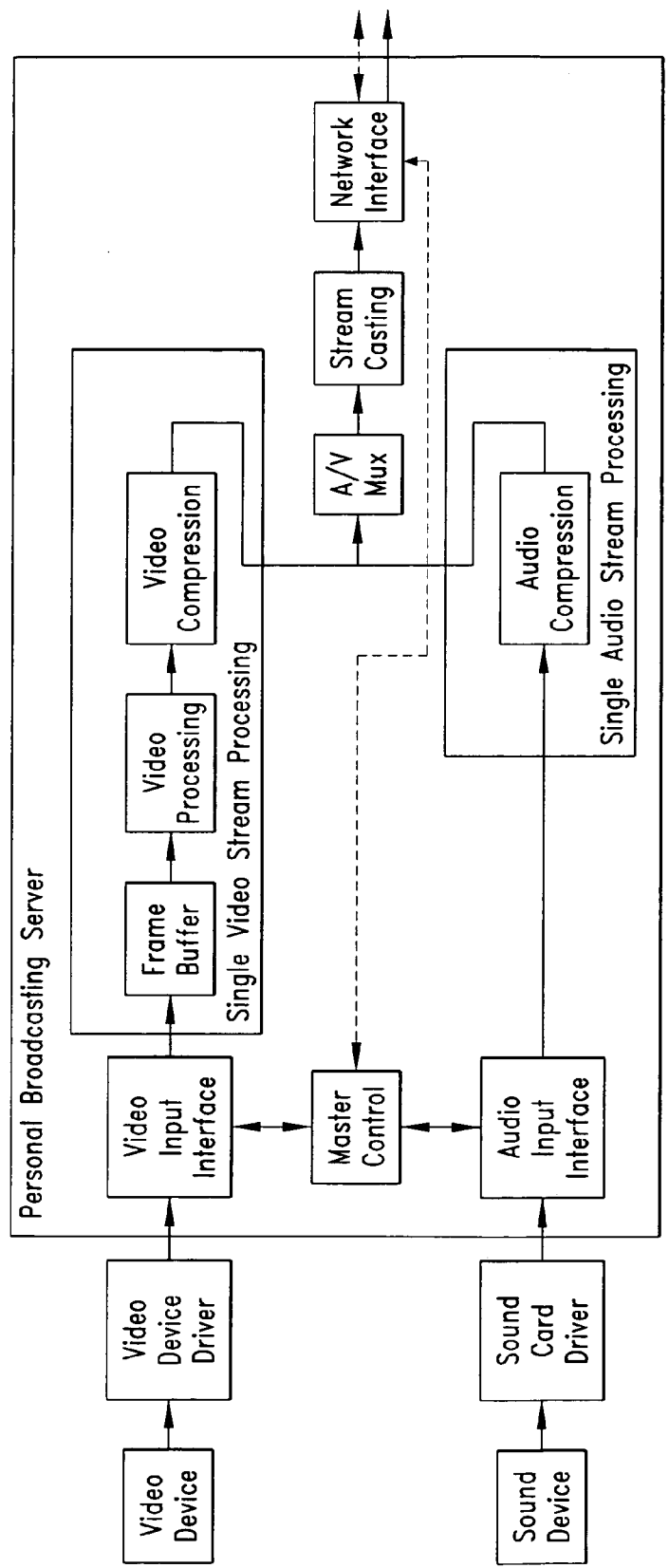

An example of a personal broadcasting server according to the present invention can be provided by any one or a combination of the simplified diagrams of FIGS. 2C to 2D. As shown, the server 250 receives video data from video device 251, which couples to driver device 252. The server 250 also receives audio data from sound device 268, which couples to sound card driver 267. Master control 261 communicates between video interface 253, audio interface 262, and network interface 260, as well as other blocks. Video data enters video input interface, which transfers the video into a series of blocks 254 including frame buffer 255, video processing 256, video compression 257, stream casting 258, and network interface 259. Additionally, audio transfers through the audio input interface, which transfers the audio through a sequence of blocks 266 including audio compression 263, stream casting 264, and network interface 265. Each of these blocks carry out functionality common known in the art as well as described above and throughout the present specification. The personal broadcasting server generally receives video data in a first format and converts such video data into a second format for transmission over to a client device, which is coupled to the network. Here, the video data in the first format cannot effectively be used by the client device.

If implemented in hardware or partially in hardware, an efficient multiplexer or cross-bar mechanism can be used for embodiments of the present invention. If implemented in software, little if any additional hardware interconnections are typically required. Additionally, the above description in terms of specific hardware is merely for illustration. It would be recognized that the functionality of the hardware be combined or even separated with hardware elements and/or software. The functionality can also be made in the form of software, which can be predominantly software or a combination of hardware and software. One of ordinary skill in the art would recognize many variations, alternatives, and modifications. Details of a personal broadcasting process according to the present invention are provided below.

A personal broadcasting process according to an embodiment of the present invention is briefly described below:

1. Connect to personal broadcasting web server;
2. Register user to broadcast audio/video;
3. Set-up session for audio/video;
4. Activate broadcast;
5. Monitor broadcast;
6. Correct and/or archive broadcast, as necessary;
7. Terminate broadcast; and
8. Perform any other steps.

The above sequence of steps is merely an example. The steps can be performed on, for example, from a client device such as a personal computer or the like, which is coupled to the Internet. The steps provide an easy to use process for personally broadcasting audio/video information from a source to a client device. Preferably, the client device is mobile. The mobile client device includes the ones noted above as well as others. Details of the present process are described in more detail below in reference to the Fig.

Figure 3:
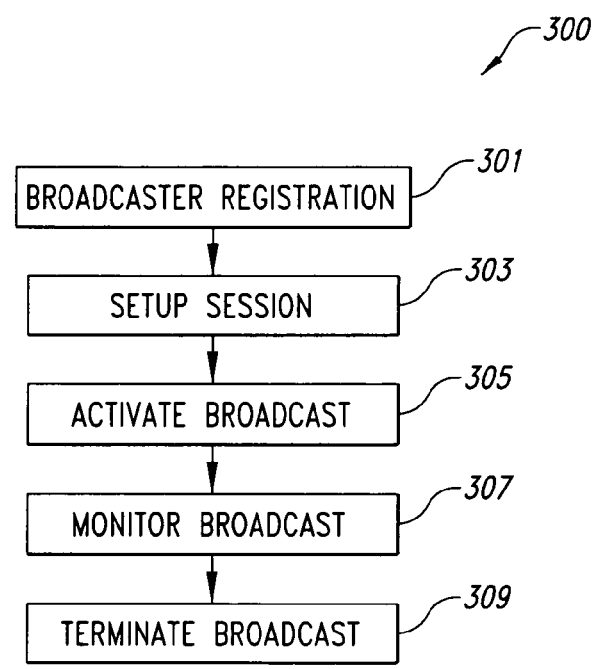
FIGS. 3 and 3A to 3D are simplified flow diagrams illustrating broadcasting methods according to embodiments of the present invention.

FIG. 3 is a simplified flow diagram 300 illustrating a personal broadcasting method according to an embodiment of the present invention. This diagram is merely an example, which should not unduly limit the scope of the claims herein. One of ordinary skill in the art would recognize many other variations, modifications, and alternatives. As shown, the flow diagram includes a variety of steps, but begins with a registration process, step 301, which is followed by steps of setting up a session (step 303), activating the broadcast (step 305), monitoring the broadcast (step 307), and terminating the broadcast (step 309), among others, if desired. Here, a client device (a personal broadcasting audio/video server) connects to a personal broadcasting web server, which is coupled to a worldwide network of computers, such as an internet or the Internet. The web server can be similar to the one noted above, but can also be others. The client device can include a personal computer, a personal digital assistant, a pager, a personal computer a notebook computer, a laptop computer, and a workstation, among others.

Figure 3A:
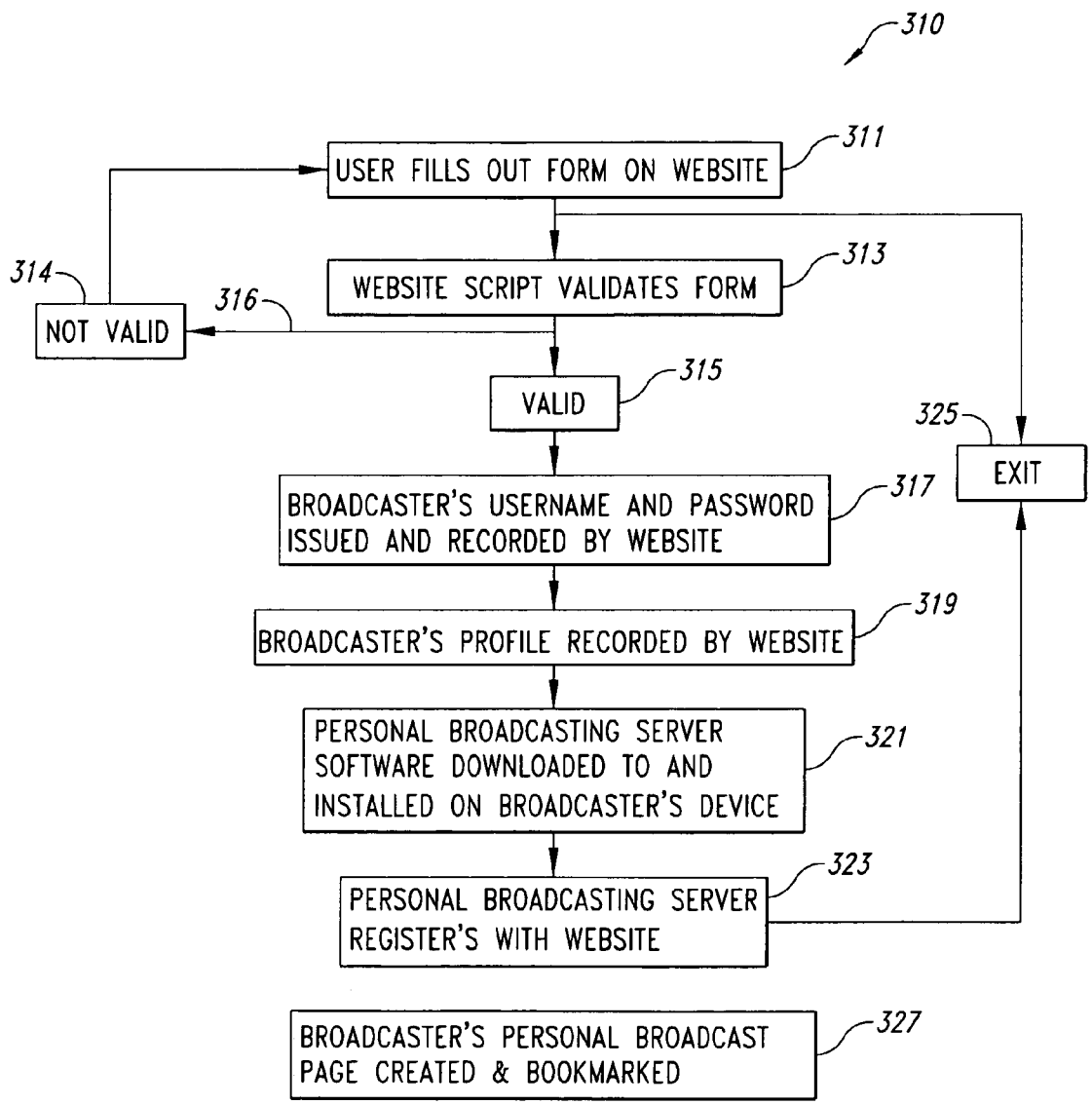

Next, the potential broadcaster registers (step 301) with the web site. FIG. 3A is a simplified flow diagram 310 illustrating a personal broadcasting registration method according to an embodiment of the present invention. This diagram is merely an example, which should not unduly limit the scope of the claims herein. One of ordinary skill in the art would recognize many other variations, modifications, and alternatives. Once the user is connected to the web site, the user (who is the potential broadcaster) fills (step 311) out a registration form on the web site. The registration form includes fields for a user name, password, profile information, and other information. The profile information can include a list of private viewers in various groups or a designation for public broadcasting. In some embodiments, it may also include demographics and other information, which may be used by marketers, advertisers, and other agents, in identifying product and other information, which may be of interest to the broadcaster. Profile information also includes details of the camera or other audio/video source device used by the broadcaster as well as the bandwidth available to the broadcaster, the processing unit, memory, and operating system of the broadcaster's server or computer. The registration form is entered from the client, which sends the form to the server via the network.

The web site script validates the form, step 313. If the form is valid, the method continues to the next step. Otherwise, the method returns via branch 316 to the form again, which continues until a predetermined number of times or becomes valid. The web site issues and records (step 317) the user name and password. Additionally, the profile information is recorded (step 319) by the web site. Next, the personal broadcasting server software is downloaded (step 321) from the web site onto the broadcaster's device. The personal broadcasting server registers (step 323) with the web site, using the downloaded software. The method ends at step, 325.

Optionally, the broadcaster's personal broadcast page is created and book marked, step 327. Here, the broadcaster can track the uniform resource locator (URL) of the broadcaster's personal web page. Once at this page, the broadcaster will often only need to click on a button on the web page in order to begin the broadcasting session. The broadcaster's personal broadcast page can be accessed by the broadcaster from anywhere on the Internet and riot just from the broadcaster's personal computer and camera. Accordingly, the broadcaster can remotely setup, start, or stop a broadcasting session simply by clocking on a start button on the personal web page.

Figures 1, 3B:
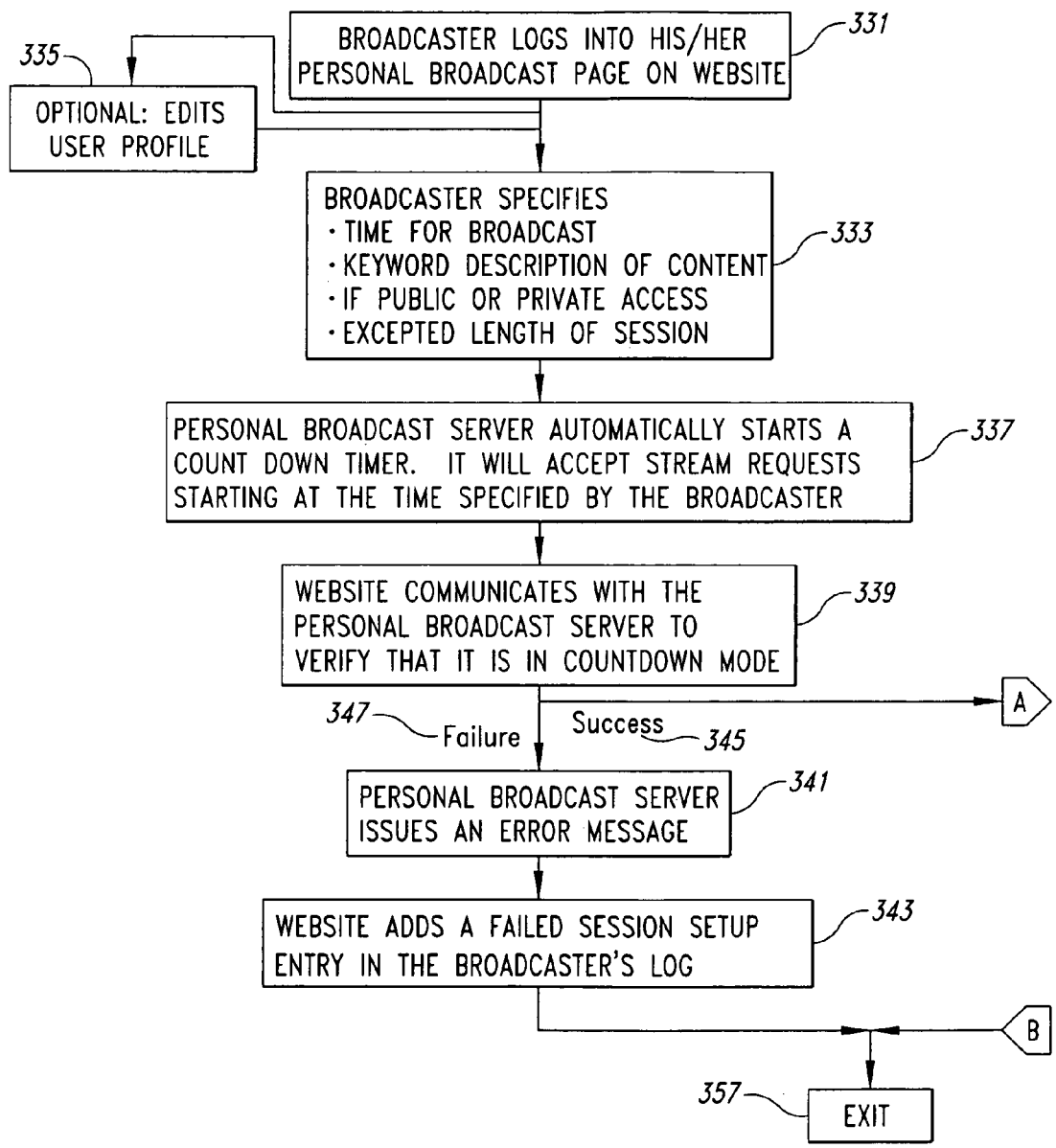
Figures 2, 3B:
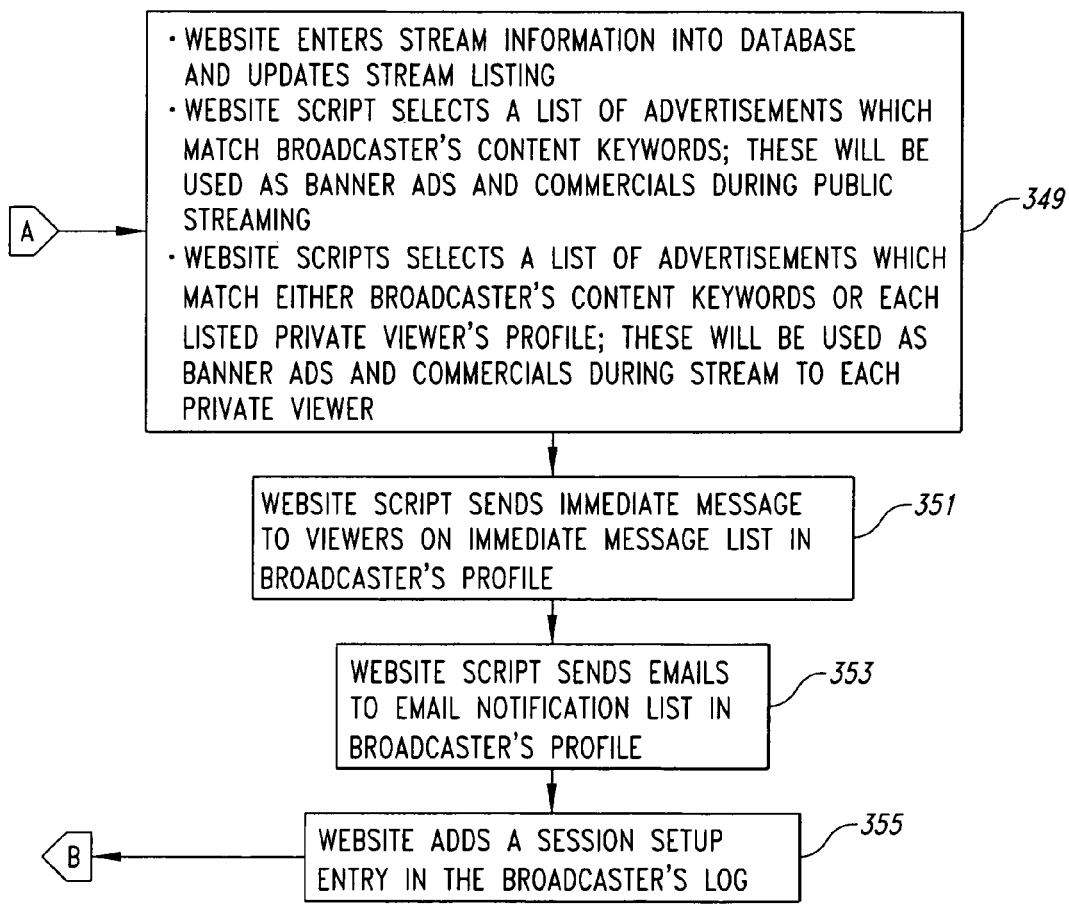

Once registration is completed and broadcasting software has been downloaded, the method sets up a broadcasting session. For example, FIG. 3B is a simplified flow diagram 330 illustrating a personal broadcasting setup session according to an embodiment of the present invention. This diagram is merely an example, which should not unduly limit the scope of the claims herein. One of ordinary skill in the art would recognize many other variations, modifications, and alternatives. The method begins by connecting a broadcaster's audio/video server onto the broadcasting web site. Next, the broadcaster logs (step 331) onto a designated web site, which is often the broadcaster's personal web page, such as the one noted above. Optionally, the broadcaster edits (step 335) the user profile, which was previously provided.

Next, the broadcaster specifies procedural information about the broadcast, step 333. In a specific embodiment, the broadcaster enters information such as time for broadcast, keyword or words of description of broadcast content (e.g., sports, family, personal, product demonstration), limit of access (e.g., public, private, group list), and excepted length of session, as well as other procedural information. This information is often entered as text information in fields on a graphical user interface. The text information including the procedural information is transferred from the broadcasting audio/video server to the web site of personal broadcasting server.

The broadcasting server begins a countdown time, including a zero for immediate start, step 337. The countdown time often begins automatically, but can also be initiated manually or semi-automatically. Once the designated start time has been reached, the broadcasting server is ready to accept stream requests from the client devices. Next, the web site from the personal broadcasting web server communicates with the broadcasting audio/video server to verify that it is in countdown mode. If the audio/video server is not in countdown mode, failure occurs, step 347. The broadcasting audio/video server outputs an error message, step 341, to the web site. The web site receives the error message and adds a failed session set entry into the broadcaster's log, step 343. Next, the method will exit, step 357, where the method can return back to one of the above steps or others.

If the countdown has been verified, the setup method is success, step 345, and processing of setup information (step 349) occurs at the web server. Here, the web site receives and enters stream information into a database, which is coupled to the server. In a specific embodiment, the web server may include advertisements or other information that may be attached to streaming video. Here, the web site script queries and then selects a list of advertisements from a data base which relate or match the broadcaster's content keywords. The web site script can also select a list of advertisements that relates to or match either broadcaster's content keywords or each listed private viewer's profile. Depending upon the specific embodiment, one or more of these process steps is provided.

Next, the web site script sends (step 351) messages to potential viewers of the broadcast on the immediate message list. In a specific embodiment, the messages can be sent using one of a variety of ways such as electronic mail (called e-mail), instant messaging, paging, faxing, and others. The web site script sends (step 353) e-mail messages based upon an e-mail notification list. The e-mail notification list is on the broadcaster's personal profile or the like. The e-mail messages are derived from the personal broadcasting server and routed to one of a plurality of designated e-mail addresses via the world wide network of computers or the like. Once the messages have been sent, the web site adds a session set up entry into the broadcaster's log, step 355. Other steps can follow.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 3C:
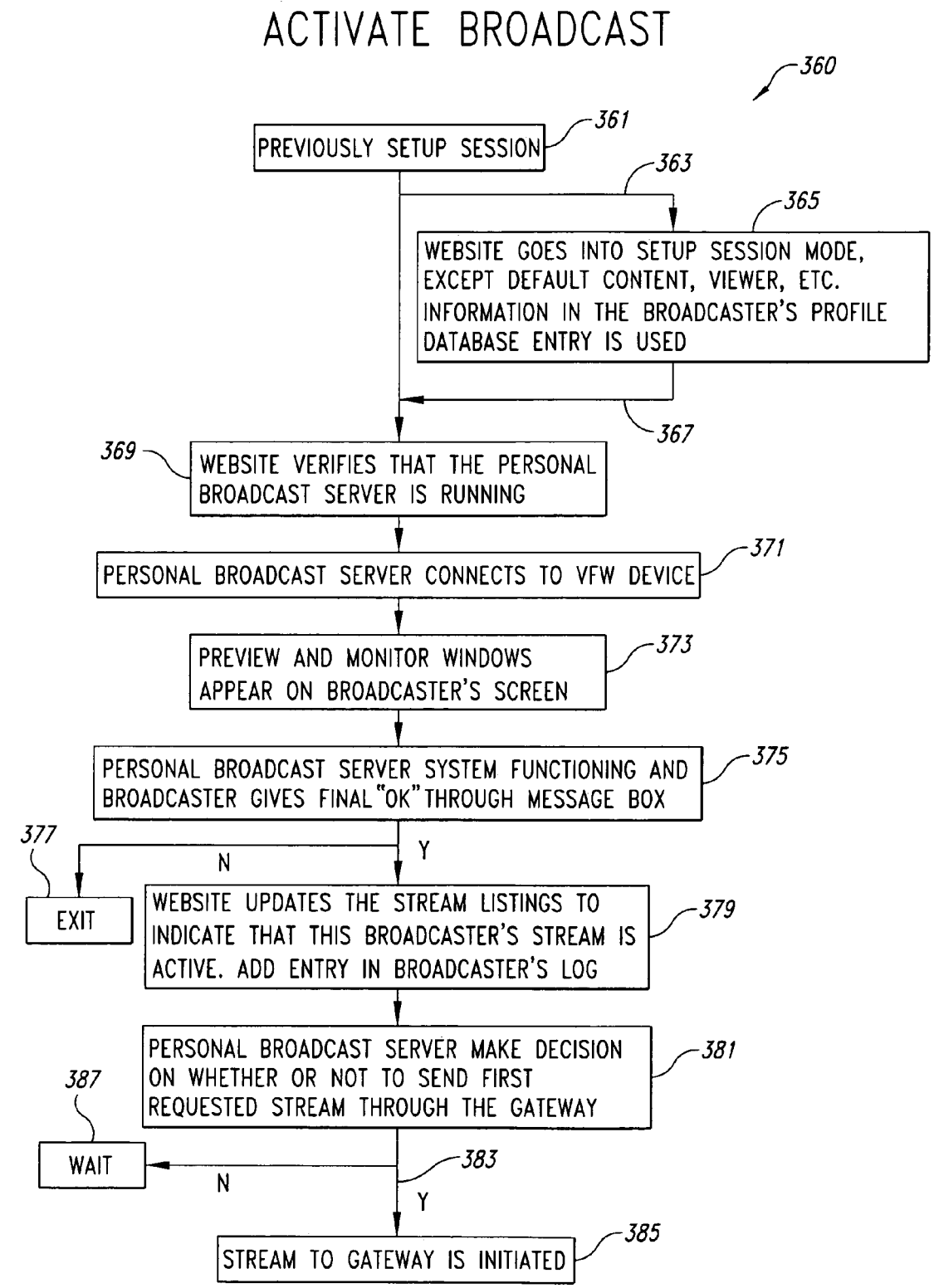

FIG. 3C is a simplified flow diagram 360 illustrating a personal broadcasting method for activating a broadcasting session according to an embodiment of the present invention. This diagram is merely an example, which should not unduly limit the scope of the claims herein. One of ordinary skill in the art would recognize many other variations, modifications, and alternatives. The present method begins where the previous setup session ended, step 361. Here, the method can initiate the web site to go back via branch 363 into the set up mode, step 365, where the broadcaster could update previously entered profile information. Alternatively, the web site uses the default settings in the personal profile via branch 367. The web site verifies that the personal broadcasting audio/video server is running, step 369.

Next, the broadcasting audio/video server connects to a video device compatible with Video for Windows™ by Microsoft Corporation, but can be others. Once connection has been established, the preview and/or monitor windows prompt onto the display coupled to the personal broadcasting audio/video server, step 373. The broadcaster previews and monitors information on the display. Next, the broadcaster gives final approval by providing information to a message box. The approval is transferred to the personal broadcasting web site. The method completes and goes to exit, step 377. Alternatively, the web site updates any of the stream listings to indicate that the broadcaster's stream is active. Such active status is provided into the broadcaster's log. Once the active status is provided, the personal broadcasting server decides if or not to send (step 381) the first requested stream to the gateway. In one embodiment, the personal broadcasting server waits, step 387. Alternatively, the broadcasting server initiates a stream of audio/video data via branch 383 to the gateway, which distributes the audio/video. Now the broadcasting system has been activated. Once the broadcasting system has been activated, the broadcaster can terminate the audio/video broadcast according to an embodiment of the present invention.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 3D:
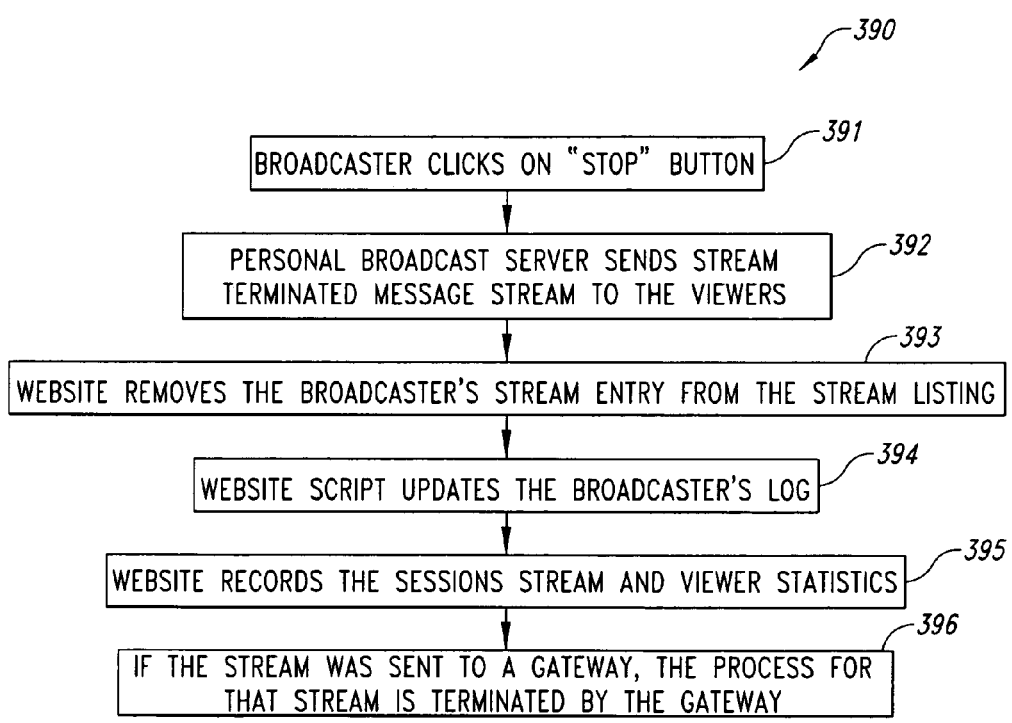

FIG. 3D is a simplified flow diagram 390 illustrating a personal broadcasting method according to an embodiment of the present invention. This diagram is merely an example, which should not unduly limit the scope of the claims herein. One of ordinary skill in the art would recognize many other variations, modifications, and alternatives. As shown, the broadcast terminates with, for example, a click of a stop button on the broadcaster's personal broadcasting page, step 391. Next, the personal broadcasting server sends a stream terminated message to viewers of the broadcast. The message originates from the broadcasting server, traverses through the PBWS, and is transferred to one of a plurality of client devices, which receive and display the broadcast.

The web site then removes (step 393) the broadcaster's stream entry from the stream listing. The web site script updates the broadcaster's log, step 394. In some embodiments, the web site also records the broadcasting sessions' stream and viewer statistics. In some aspects, these statistics can include, for example, length (or time) of broadcast, number of Megabits from personal broadcast server, average number of Megabits/stream from the personal broadcast server, number of streams served from the personal broadcast server, number of streams served from gateways on behalf of the broadcaster, keywords and other content or context information, characteristics (e.g., bandwidth, format, resolution, color depth, frame rate, contrast, brightness, source of stream (e.g., PBS or gateway)) of each unique or independent stream served, which is indexed by stream identification number, and identification of each of the viewers of the streams along with other information (e.g., stream identification number, start and/or stop times, archived stream start/stop times of each of the viewers, times at which instant replay is used, advertisements seen, average bit rate consumed, total bandwidth consumed), and other desirable information. Depending upon the embodiment, the method may terminate at the personal broadcasting server or the gateway. If the stream of audio/video has been sent (step 396) to the gateway, termination also occurs at the gateway in some embodiments.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

A personal broadcasting viewing process according to an embodiment of the present invention is briefly described below:
1. Connect the viewer client to web server;
2. Register viewer to receive broadcast of audio/video;
3. Input viewer client profile information;
4. Set-up stream configuration;
5. Select stream;
6. View stream;
7. Correct stream, as necessary;
8. Terminate stream; and
9. Perform any other steps.

The above sequence of steps provides an easy way to register a client device, which will receive the audio/video broadcast. Here, the steps generally use a step of direct information entry of profile information to provide the web server information for proper formatting of audio/video streams for compatibility purposes. Although the above sequence generally shows direct registration, automatic or indirect methods can also exist. One of ordinary skill in the art would recognize many other variations, modifications, and alternatives. In other embodiments, some fo the above steps may not be performed, for example, steps 4 and 7 may not be executed. Details of these steps are provided below in reference to the Figs.

Figure 4:
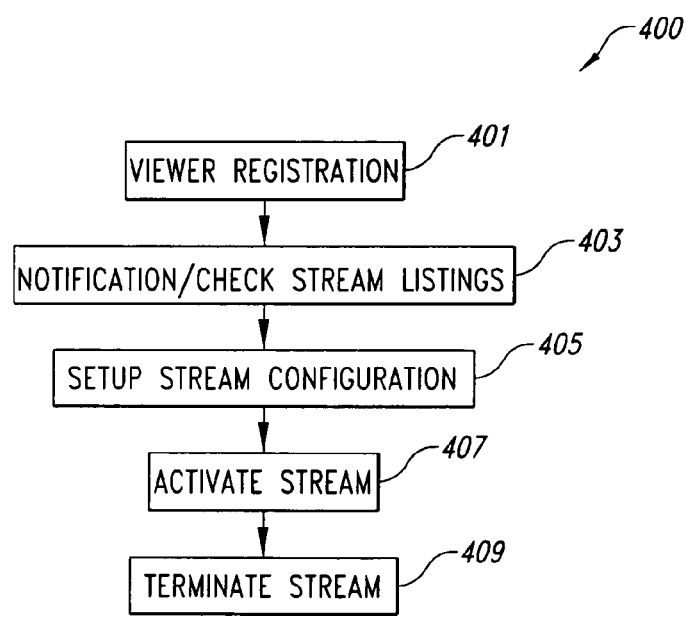
FIGS. 4 and 4A to 4B are simplified flow diagrams illustrating viewing methods according to embodiments of the present invention.

FIG. 4 is a simplified flow diagram 400 of a viewing process according to an embodiment of the present invention. This diagram is merely an example, which should not unduly limit the scope of the claims herein. One of ordinary skill in the art would recognize many other variations, modifications, and alternatives. As shown, the flow diagram 400 includes a variety of steps such as viewer registration (step 401), notification/check stream listings (step 403), setup stream configuration (step 405), activate stream (step 407), and terminate stream (step 409). The user of a client device such as the one noted as well as others registers the device. The client device can be mobile devices such as a cellular phone, a personal digital assistant, a laptop computer, a web appliance, a desktop computer, or any networked device capable of receiving and playing audio and/or video.

Figure 4A:
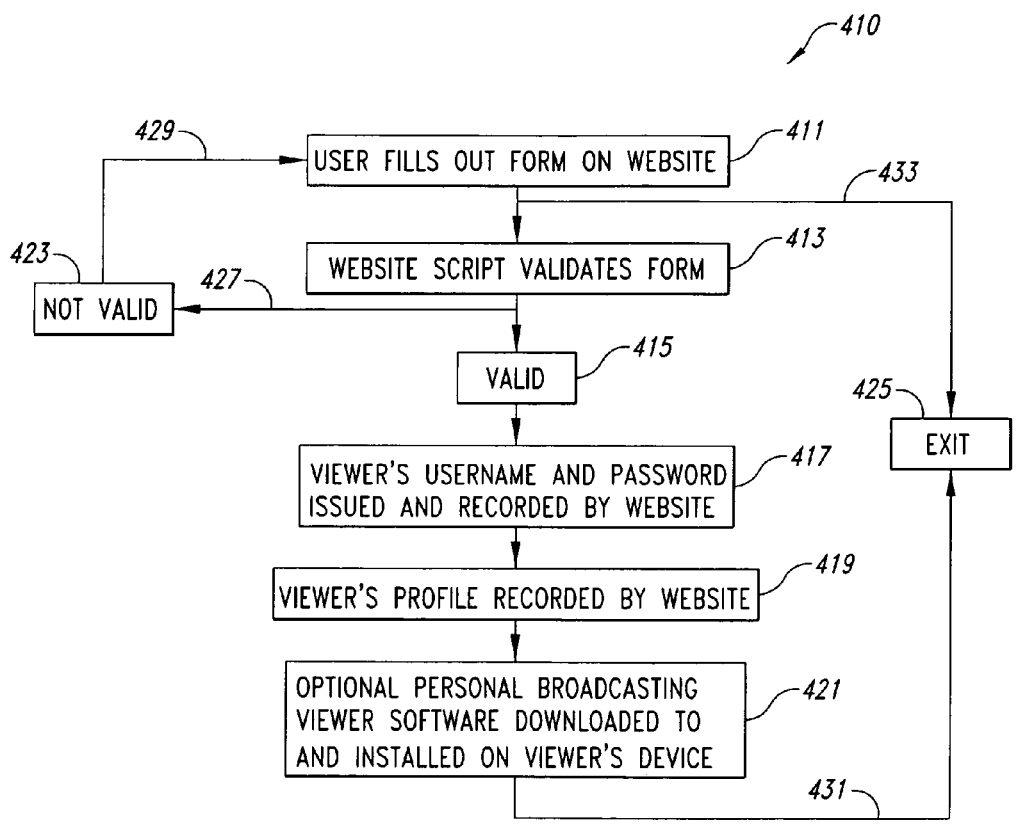

Registration specifies profile information about the user and the device so that the web server provides selected audio/video data to the client device. In a specific embodiment, user registration is provided by a method 410 illustrated in the diagram of FIG. 4A. This diagram is merely an example, which should not unduly limit the scope of the claims herein. One of ordinary skill in the art would recognize many other variations, modifications, and alternatives. The present method begins with a client device such as a viewer device. Here, the user fills (step 411) out a form on the web site. The client device can be connected to the web site or such form can be accessed through another client device including a personal computer, a workstation, and others.

The user enters profile information on the form. The form can include fields for a user name, password, profile information, and other information. The profile information can include a list of private viewers in various groups or a designation for public broadcasting. In some embodiments, it may also include demographics and other information, which may be used by marketers, advertisers, and other agents, in identifying product and other information, which may be of interest to the viewer. Profile information also includes details of the client device used by the viewer as well as the bandwidth available to the viewer, the processing unit, memory, and operating system of the viewer's client device. In a specific embodiment, the form is entered from the client, which sends the form to the server via the network.

Next, the form is sent to the web site from the client device where the web site script validates the form, step 413. Alternatively, the method goes to exit (step 425) via branch 433 to stop the method. If the form is valid (step 415), the method continues. Alternatively, the method loops back via branch 427, outputs an invalid prompt (step 423), and returns via branch 429 to step 411 where another form is prompted. If the form was valid, the method issues and records (step 417) the viewer's user name and password. Such user name and password are stored in memory of the web site. The viewer's profile is also recorded, step 419, by the web site.

Optionally, the method allows for software to be downloaded (step 421) from the web site to the client device. The software allows for selected audio/video processing features and control aspects at the client device. In certain embodiments, the client device is a mobile device, which has limited processing power and memory, as well as constrained by bandwidth. Accordingly, it is often desirable to provide limited processing software to the client device since such device is often "thin" as compared to processing power of the web site. Once the software has been downloaded, the method goes to exit (step 425) via branch 431.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Figure 4B:
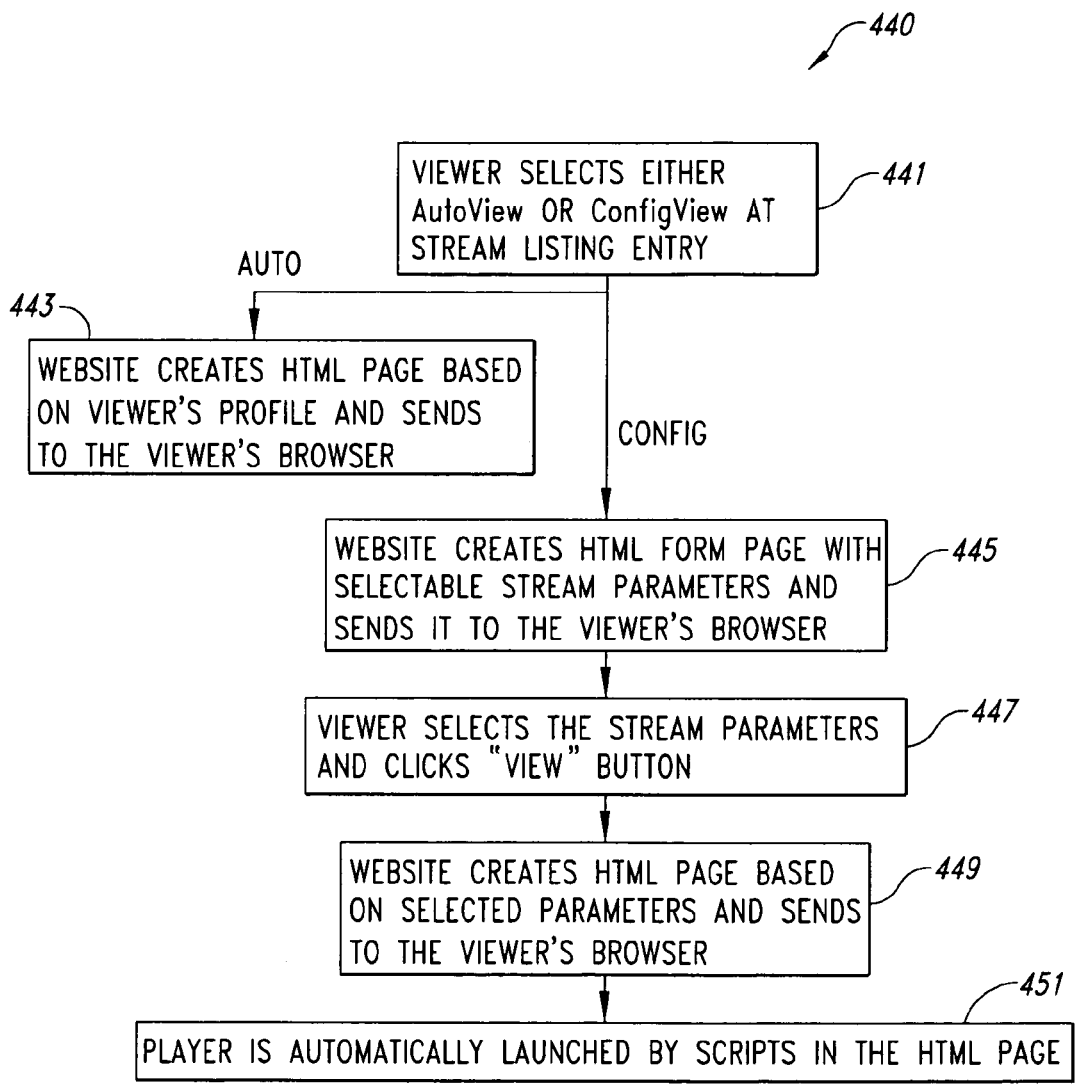

In a specific embodiment, the method has steps 440 for stream configuration, such as the one illustrated by FIG. 4B. This diagram is merely an example, which should not unduly limit the scope of the claims herein. One of ordinary skill in the art would recognize many other variations, modifications, and alternatives. As shown, the method begins where a viewer selects either an "autoview" or "configview" at stream listing entry. There may also be other selections in other embodiments. Entry is provided by a key, a click, voice, or other user interface device to the client.

In the autoview configuration, the method displays the audio/video data in a predetermined format. Here, the method executes step 433, where the web site creates an HTML page (or other standard based language) based upon the viewer's profile, which was previously entered, and sends the HTML page to the viewer device through a network. Once the HTML page has been sent to the viewer device, it is ready to receive streaming video.

In an alternative configuration, the viewer selects various parameters for a streaming video session. Here, the method allows for the web site to create (step 445) an HTML form on the page with fields for selected stream parameters. The HTML form is sent from the web site to the viewer device through the network. The HTML form is prompted at the viewer device through the browsing device. Next, the viewer selects (step 447) the stream parameters. Here, the user can merely click on the desired parameters or enter the desired parameters through an interface device. The desired parameters through the form are sent back to the set site for configuration of the streaming session.

Next, the web site forms an HTML page from the parameters that were sent. The HTML page is transferred from the web site to the viewer device through the network, step 449. The viewer device receives the HTML page, and launches scripts of the HTML page automatically, step 451. Once the scripts have been launched, the setup method may be completed. Next, the method can activate the stream (step 407) by clicking on a start button. The stream can also be terminated (step 409) by clicking on a stop button. Alternatively, the stream can stop automatically once the streaming audio/video data has ceased.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

EXAMPLE

To prove the principles and operation of the present invention, experiments can be performed to implement the present invention. Here, the present invention provides for an acquisition and delivery of audio and video information from a USB PC camera to any device, which is capable of decoding and displaying ACELP audio and MPEG-1 video. Management, stream initiation, stream viewing, and other functions can be implemented or hosted on a web page of its own server or a web page of a general portal such as Yahoo!™ or others. The page can include hyperlinks for a variety of features such as registration, broadcasting, and viewing. The agents and database behind this web page will be termed "Directory Services."

A broadcaster performs a one-time registration of his/her camera with the Directory Services via the Personal Broadcasting Central web page at the general portal. This action will lead to the following:

1. A Personal Broadcasting Server (PBS) installation package will be downloaded to the Broadcaster's computer. PBS is the ActiveX control that will be launched via interaction with a general portal web page (see below) and which will stream MPEG-1 compressed video and ACELP compressed audio from the Broadcaster's machine to the Internet.
2. The Directory Services will update its listing to reflect the Broadcaster's information.
3. A log in ID and password will be issued to the Broadcaster.
4. A Personal Broadcasting Page will be created specifically for that Broadcaster. It is this page that the Broadcaster will interact with whenever he/she wants to initiate or stop a session.
5. A cookie will be placed on the Broadcaster's PC. This will provide for immediate access to the personal broadcasting page.
6. Other actions to be defined by general portal.

A viewer performs a one-time registration with the Directory Services at the general portal. This action will lead to the following:

1. A Personal Viewer (PerView) installation package will be downloaded to the Viewer's computer. PerView is the plug-in which will be launched via the web page (see below) and which will decompress and display MPEG-1 compressed video and ACELP compressed audio streams.
2. The Directory Services will update its listing to reflect the Viewer's information.
3. A cookie will be placed on the Viewer's PC. This will allow the Directory Services to identify the Viewer whenever he/she connects.
4. Other actions to be defined by the general portal.

When a Broadcaster is ready to stream, he/she navigates to the personal broadcasting page on which there will be "Start" and "Stop" buttons. By clicking on either the Start or Stop button, the Broadcaster enables or disables streaming from his/her machine. These buttons will be linked to PBS ActiveX control. The Start button activates PBS and notifies the Directory Services that the particular camera is broadcasting. It also notifies (via email or some instant messaging mode) a list of people that the Broadcaster has specified in his/her personal broadcasting page. The Broadcaster also specifies that the current session is to be either private or public. If it is private then those registered viewers whom the Broadcaster has listed in his/her profile will be notified and allowed to connect to the stream; the Directory Services will do this by matching viewer id's against the notification list. If the session is public, then the camera will be listed by Directory Services on its public page.

Viewers choose streams either from the stream listing page. If a private stream is chosen, Directory Services verifies the Viewer's ID (presented by the cookie on his/her machine) against the list of allowed ID's. The PBWS then issues the Viewer a page from which he/she can configure the desired stream (or do an AutoView). The configuration parameters, along with source and destination IP addresses pass as a new stream request to the PBWS. The PBWS then passes these to the gateway (see below) which, in turn, determines if these parameters are allowed and respond to the Directory Services. If the parameters are allowed, the Gateway decides to direct the stream either directly from the Broadcaster to the Viewer, or have the stream go through the Gateway on its way to the Viewer. Later, when the Gateway HW is deployed, further processing by the Gateway will be possible.

At a high level, the broadcasting system includes a variety of elements such as:
1. PBS software for the streaming of audio and video from the USB cameras. There can be multiple streams of audio and video; each stream may have unique characteristics.
2. Gateway software (version 1) for the management of streams between the USB cameras and client displays. The Gateway makes decisions such as:
   (a) Are requested streams possible?
   (b) Should streams be sent through the Gateway or directly from PBS to the Viewer.
   It is also maintains statistics on the streams. In principle, we expect that many instances of the Gateway software will be run; the PBWS is responsible for load balancing these.
3. Client decoder software for the decompression of MPEG-1 and ACELP audio streams. These are separate MPEG-1 (YUVout) and ACELP (PCMout) decoder libraries.)
4. Client player software (such as Per View™ by Luxxon Corporation) for the display of the decompressed streams.
5. Personal Broadcasting Central (PB WS) web server (registration agents, camera hosting interface, client viewing interface) software and hardware.

Figure 5:
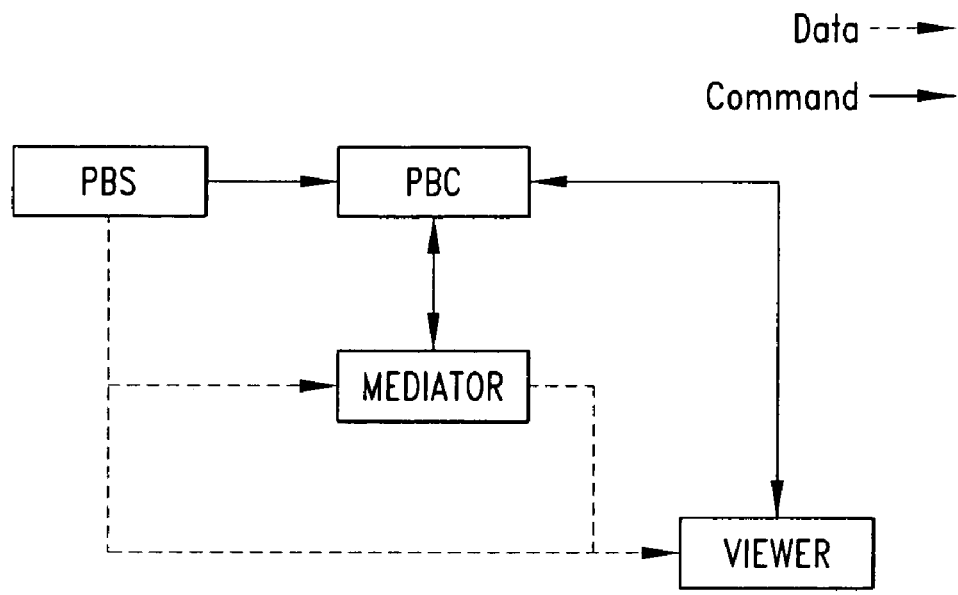
FIGS. 5, 6, and 7 are simplified diagrams of an embodiment of a personal broadcasting system according to an embodiment of the present invention.
Figure 6:
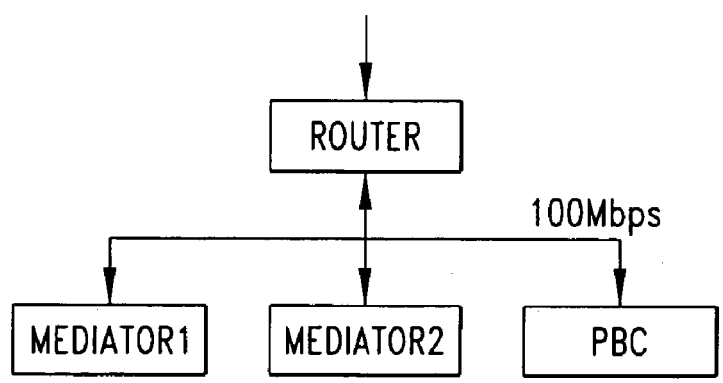
Figure 7:
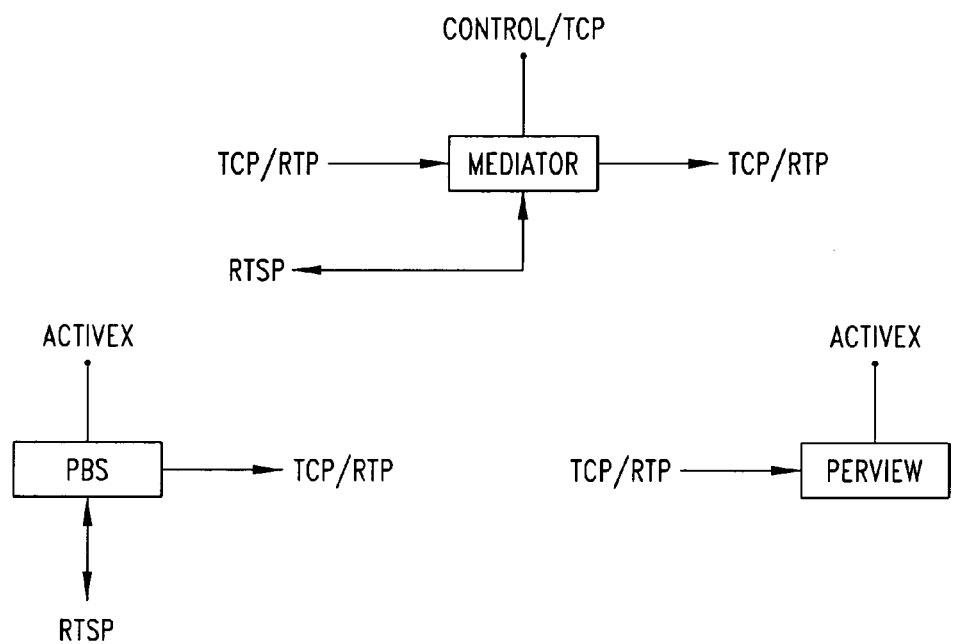

As merely an example, FIG. 4 is a simplified diagram of high level system architecture according to the present experiment. This diagram is merely an illustration which should not unduly limit the scope of the claims herein. One of ordinary skill in the art would recognize many other variations, modifications, and alternatives. As shown, the diagram includes elements such as PBS coupled to PBWS. Also shown is a gateway and viewer. Here, the dotted lines represent data and the command lines are shown in the solid lines. In one embodiment, the present networked structure of the PBWS-Gateway sub-system is expected to be on a 100 Mbps or greater LAN as shown in the simplified diagram of FIG. 5. As shown, the interfaces include TCP or RTP for data, TCP or RTSP for control, ActiveX, and there may be others.

Additional protocol information about commands and messages between the various elements are provided below. For easy readying, the elements have been provided under the underlined headings.

Gateway:

The protocol between the Gateway and the PBWS often requires that the PBWS issue commands to the Gateway along with parameters (see below) which define the streams and connections to broadcasters and viewers. The commands are:

| COMMANDS/MESSAGES | DESCRIPTION |
| --- | --- |
| ApproveStreamRequest | PBWS asks the Gateway to approve a stream which a potential viewer has requested. |
| NewStream | PBWS registers and starts a new streams with the Gateway. |
| StopStream | PBWS requests that the Gateway terminates a stream which is currently running. |
| GetStreamStatus | PBWS requests that Gateway returns statistics and other information on a particular stream. |
| StreamError | Gateway notifies the PBWS that an error has occurred with a particular stream. |

Each Gateway generally includes a Pentium III 500 MHz by Intel Corporation, a 128 MB or greater SDRAM, Windows NT by Microsoft Corporation, and two 100 Mbps Ethernet NICs.

Personal Broadcasting Server:

| Version 1 of the PBS will perform as follows: | | |
| --- | --- | --- |
| METRIC | TARGET | |
| Output frame rates | MPEG frame rates up to 15 fps, but fixed for each stream | |
| Output resolutions | Configurable from VGA down | |
| Output chroma modes | 4.2.0 only | |
| Output Video formats | Format | Resolution |
|  | MPEG-1, 2 | VGA or less |
|  | JPEG, GIF | VGA or less |
| Major Stream Parameters | Resolution | Bandwidth |
|  | Color Depth | Format |
|  | Frame Rate | |
| Stream Controls | Start stream | |
|  | End stream | |
| # Concurrent Streams | Up to 8 (depends on bandwidth and CPU) | |

-continued

Version 1 of the PBS will perform as follows:

| METRIC | TARGET | |
|---|---|---|
| Output Color Depths | (24 bit 4:2:0 YcbCr) (1 bit BW) | |
| | (8 bit gray scale) (8 bit color) | |
| Audio | Format | Bandwidth |
| | ACELP | 5 kpbs |

In other embodiments, audio can include formats such as MP1, MP2, MP3, G.723.1, and H.263 and MPEG4 video. PBS defines an ActiveX control interface for the following actions from a form based web page:

| ACTION | DESCRIPTION |
|---|---|
| Start Button Click | Starts the PBS allowing either clients or the Gateway to initiate streams. |
| Stop Button Click | Terminates the streaming session. |
| Video On/Off Check | Allows Broadcaster to turn off video (default is on) |
| Audio On/Off Check | Allows Broadcaster to turn off audio (default is on) |
| Preview Type List Box | Allows user to select from |
| | No preview |
| | Local preview |
| | Stream preview |

The following parameters define the stream to be produced and sent from the PBS to either the Gateway or the PerView:

| PARAMETER | DESCRIPTION |
|---|---|
| IPADDR | Destination IP address |
| WIDTH | The width of the video frames |
| HEIGHT | The height of the audio frames |
| BITRATE | The target bit-rate for the stream |
| FRAMERATE | The target frame rate for the stream |
| CONTRAST | The contrast gain setting [−15, 15] |
| BRIGHTNESS | The brightness shift setting [−15, 15] |
| COLORFLAG | The color depth |
| VIDEO FORMAT | The compression format for the video |
| | 0 - no video |
| | 1 - MPEG-1 |
| AUDIO FORMAT | The compression format for the audio |
| | 0 - no audio |
| | 1 - ACELP |
| UNUSED | For future use |

The PBS often requires elements including PIE 300 MHz or greater, at least 64 MB SDRAM, Win98, at least a 56 kbps modem connection with IP address, Microsoft compliant USB Camera, Microphone, and Microsoft compliant sound card w/ speakers.

PerView:

For design and testing purposes, we have developed an MPEG-1, -2 and ACELP and MP2 audio player called Personal Viewer (PerView). PerView as an embedded application in a web page is launched. The web page is prepared and returned to the Viewer by the Gateway. It contains the following parameters that define its interface to both the Gateway and PBS:

| PARAMETER | DESCRIPTION |
|---|---|
| PARAMKEY | Key to be used in decrypting param |
| DATAKEY | Key to be used in decrypting data |
| IPADDR | IP address of the source stream/camera |
| VPORT | The port # of the video source |
| APORT | The port # of the audio source |
| WIDTH | The width of the video frames |
| HEIGHT | The height of the audio frames |
| BITRATE | The target bit-rate for the stream |
| FRAMERATE | The target frame rate for the stream |
| CONTRAST | The contrast gain setting [−15, 15] |
| BRIGHTNESS | The brightness shift setting [−15, 15] |
| COLORFLAG | The color depth (0 = grayscale, 1 = 24 bit color) |
| PLAYDURATION | The number of seconds to continue playing |
| VIDEO FORMAT | The compression format for the video |
| | 0 - no video |
| | 2 - MPEG-1 |
| AUDIO FORMAT | The compression format for the audio |
| | 0 - no audio |
| | 1 - ACELP |
| UNUSED | For future use |

The PerView includes at least a Pentium II 300 MHz or greater device by Intel Corporation, at least 64 MB SDRAM, Win98 or higher by Microsoft Corporation, at least 56 kbps modem connection with IP address, and Microsoft compliant sound card w/ speakers. In the present example, the above parameters are encoded in the web page as a string of characters which must often be decrypted by the PARAM key. The key itself is passed as a parameter in the web apge. The encryption/decryption method is often known to be PerView application, PBWS, and PBS.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for digital audio/video transmission to mobile computing devices including registering a client device with a server for receiving audio/video data in a useable format, the method comprising:

obtaining profile information associated with a selected format of a mobile client device at a server, the mobile client device receiving audio/video data from at least one of a plurality of source devices, the mobile client device being one of a plurality of mobile client devices, each of the mobile client devices being capable of receiving audio/video data in one of a plurality of selected formats;

at the server, determining a processing program for the selected format from one of a plurality of processing programs, each of the plurality of processing programs being stored in a the server and each processing program being usable to convert the audio/video data to a format that is different from each other's formats;

connecting at least one of the plurality of source devices of audio/video data to the server, each of the source devices being capable of outputting audio/video data in one or more formats; and at the server, converting the audio/video data from its format to the selected format through the processing program in the server based at least in part on the profile information;

transferring audio/video data in the selected format from the server to the mobile client device in a streaming session;

at the server, determining dynamically changing channel characteristics, including computing channel bandwidth;

at the server, updating the profile information during the streaming session, including updating the profile information based on dynamically changing channel characteristics and dynamically changing characteristics of the mobile client device; and at the server, adjusting the audio/video data being transferred to the mobile client device during the session and in response to the updated profile information, including server determination of appropriate audio/video data to send to the mobile client device based at least in part on the computed channel bandwidth and other channel characteristics that were determined by the server.

2. The method of claim 1 wherein the audio/video data from the source device is compressed.

3. The method of claim 1 wherein the mobile client device comprises a browsing device.

4. The method of claim 1 wherein the mobile client device is selected from one of a plurality of devices including a portable computer, a laptop computer, a personal digital assistant, a personal computer, an Internet appliance, and a work station.

5. The method claim 1 wherein the format from the source device is different in type from the selected format.

6. The method of claim 1 wherein the selected format is selected from the group consisting of MPEG-1, MPEG-2, MPEG-4, H.263, M-JPEG, M-GIF, ACELP, MP1, MP2, MP3, and G.723.1.

7. The method of claim 1 wherein the format from the source device is selected from the group consisting of MPEG-1, MPEG-2, MPEG-4, H.263, M-JPEG, M-GIF, ACELP, MP1, MP2, MP3, and G.723.1.

8. The method of claim 1 wherein the profile information includes a user name and a bandwidth requirement.

9. The method of claim 1 wherein the profile information includes a name for the mobile client device.

10. The method of claim 1 wherein the plurality of processing programs is coupled to a lookup table.

11. A method for transmitting audio/video data to viewing devices, the method comprising:

prompting at least two selections on a viewing device, the viewing device being coupled to a world wide network of computers, the two selections comprising a first selection for an automatic set up and a second selection for a manual set up;

selecting either the first selection or the second selection and transmitting the selection to a server, the server being coupled to a source of audio/video data;

if the first selection is entered, transforming at the server input audio/video data based upon a profile associated with the viewing device;

if the second selection is entered, transforming at the server the input audio/video data based on selectable parameters;

transmitting the transformed audio/video data from the server to the viewing device in a session based upon the first selection and in accordance with the profile, or based upon the second selection;

at the server, updating the profile during the session based at least in part on characteristics of the viewing device that dynamically change during the session and on dynamically changing characteristics of a connection that carries the session;

at the server, determining the dynamically changing connection characteristics including computing channel bandwidth; and at the server, adjusting the audio/video data being transmitted to the viewing device based on the updated profile during the session, including server determination of appropriate audio/video data to send to the viewing device based at least in part on the computed channel bandwidth and other connection characteristics that were determined by the server.

12. The method of claim 11 wherein the viewing device is selected from a mobile computer, a pager, a personal digital assistant, an Internet appliance, and a cellular phone.

13. The method of claim 11 wherein the viewing device is coupled to the worldwide network of computers through a wireless connection.

14. The method of claim 11 wherein the viewing device is coupled to a browsing device.

15. The method of claim 11 wherein the parameters comprise bandwidth information and processing information of the viewing device.

16. The method of claim 1 wherein the viewer's profile comprises bandwidth information and processing information of the viewing device.

17. The method of claim 1 wherein the dynamically changing stream characteristics are associated with at least one of bandwidth usage, frame rate, resolution, color depth, contrast, brightness, source of the audio/video data, streaming protocol, and stream content, and wherein the dynamically changing characteristics of the mobile device are associated with any combination of: processing capacity, memory usage, network connection, and user demographics including device location.

18. A system for transmission of audio/video data to a wireless display device, the system comprising:

a means for obtaining profile information associated with the wireless display device, the profile information including statistics associated with dynamically changing characteristics of the wireless display device and dynamically changing characteristics of a communication link to the wireless display device the means for obtaining the profile information including a server-side means for determining the characteristics of the communication link, including computing channel bandwidth;

a server means for formatting the audio/video data based on the profile information;

a means for sending the formatted audio/video data to the wireless display device in a session;

a server means for logging the statistics during the session and using the statistics to update the profile information during the session;

a server means for determining which particular audio/video data, from a plurality of available audio/video data, to send to respective wireless display devices, based at least in part on the computed channel bandwidth and other connection characteristics that were determined by the server-side means.

19. The system of claim 18 wherein the means for formatting the audio/video data includes a means for converting a single input audio/video signal into a plurality of output audio/video signals having different formats,
  wherein any of the output audio/video signals having their respective format can be selected for the display device; and
  wherein a same output audio/video signal can be selected for multiple display devices.

20. The method of claim 1 wherein converting the audio/video data includes converting a single input audio/video signal into a plurality of output audio/video signals having different formats:
  wherein any of the output audio/video signals having their respective format can be selected for the client device; and
  wherein a same output audio/video signal can be selected for multiple client devices.

21. The method of claim 11 wherein transmitting the audio/video data in the session includes transmitting a plurality of output audio/video data signals having different formats, the plurality of output audio/video data signals being derived from a same single input audio/video data signal:
  wherein any of the output audio/video signals having their respective format can be selected for the viewing device; and
  wherein a same output audio/video signal can be selected for multiple viewing devices.

* * * * *

UNITED STATES PATENT AND TRADEMARK OFFICE
CERTIFICATE OF CORRECTION

PATENT NO. : 7,069,573 B1 Page 1 of 1
APPLICATION NO. : 09/539492
DATED : June 27, 2006
INVENTOR(S) : Roger K. Brooks et al.

It is certified that error appears in the above-identified patent and that said Letters Patent is hereby corrected as shown below:

Please insert
Page 8 - sheet 6 of 19
Figure 2C should appear as :

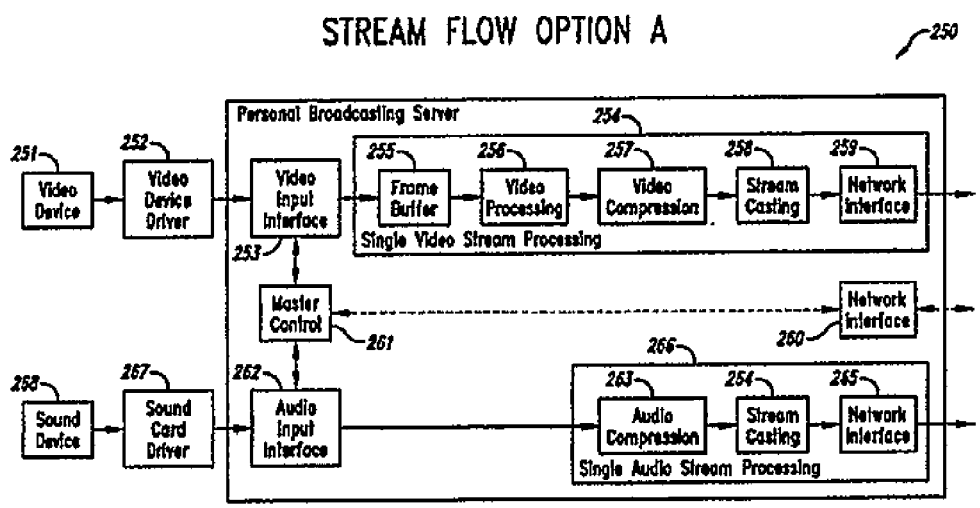

Signed and Sealed this

Twelfth Day of December, 2006

JON W. DUDAS
*Director of the United States Patent and Trademark Office*